US009286318B2

United States Patent
Matsuki et al.

(10) Patent No.: US 9,286,318 B2
(45) Date of Patent: Mar. 15, 2016

(54) EDGE SERVER AND STORAGE CONTROL METHOD

(71) Applicant: Hitachi, Ltd., Tokyo (JP)

(72) Inventors: Kunihito Matsuki, Tokyo (JP); Hitoshi Arai, Tokyo (JP); Nobuyuki Saika, Tokyo (JP); Masanori Takata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 47 days.

(21) Appl. No.: 14/349,616

(22) PCT Filed: Apr. 22, 2013

(86) PCT No.: PCT/JP2013/061798
§ 371 (c)(1),
(2) Date: Apr. 3, 2014

(87) PCT Pub. No.: WO2014/174578
PCT Pub. Date: Oct. 30, 2014

(65) Prior Publication Data
US 2015/0227550 A1    Aug. 13, 2015

(51) Int. Cl.
G06F 12/00 (2006.01)
G06F 17/30 (2006.01)
H04L 29/08 (2006.01)

(52) U.S. Cl.
CPC .......... *G06F 17/30203* (2013.01); *G06F 12/00* (2013.01); *H04L 67/1097* (2013.01)

(58) Field of Classification Search
CPC ....................... G06F 17/30203; H04L 67/1097
USPC ........................................................ 707/827
See application file for complete search history.

(56) References Cited

U.S. PATENT DOCUMENTS

| 5,377,345 | A  | * | 12/1994 | Chang et al. ................... 711/118 |
| 6,173,291 | B1 | * | 1/2001  | Jenevein ...................... 707/999.2 |
| 6,298,386 | B1 | * | 10/2001 | Vahalia ............. G06F 17/30203 709/203 |
| 6,618,735 | B1 | * | 9/2003  | Thomas et al. ........ 707/999.001 |
| 6,718,372 | B1 | * | 4/2004  | Bober ............... G06F 17/30203 707/E17.032 |
| 6,965,577 | B1 | * | 11/2005 | Murphy ............... H04Q 3/0029 370/254 |
| 2006/0101092 | A1 |   | 5/2006  | Ishida et al. |
| 2006/0173929 | A1 | * | 8/2006  | Wilson ............. G06F 17/30203 707/999.201 |
| 2007/0016586 | A1 |   | 1/2007  | Samji et al. |
| 2009/0089335 | A1 | * | 4/2009  | Shitomi ............ G06F 17/30073 707/999.2 |
| 2009/0271579 | A1 |   | 10/2009 | Ogawa |
| 2012/0016838 | A1 |   | 1/2012  | Arai et al. |

FOREIGN PATENT DOCUMENTS

| JP | 2006-134214 A | 5/2006 |
| JP | 2009-501397 A | 1/2009 |
| JP | 2009-265930 A | 11/2009 |

* cited by examiner

*Primary Examiner* — Pavan Mamillapalli
(74) *Attorney, Agent, or Firm* — Mattingly & Malur, PC

(57) ABSTRACT

A first edge server which is configured to provide a first home directory performs preventive processing of preventing a first file in a first home directory from overwriting a second file in a core space prior to coping an update of the first home directory to the core space. The second file is a file that has been updated in a second home directory and copied to the core space. The first file is a file that corresponds to the second file and that has been updated in the first home directory and has not been copied to the core space.

10 Claims, 23 Drawing Sheets

| inode number | Owner | Access right | Size | Data block address 1 | Data block address 2 | Data block address 3 |
|---|---|---|---|---|---|---|
| ... | ... | ... | ... | ... | ... | ... |
| 100 | user001 | u:g:o rxx rxw rxw | 100KB | 100-3 | 200-2 | 250-5 |
| ... | ... | ... | ... | ... | ... | ... |

300

EDGE SERVER AND STORAGE CONTROL METHOD

TECHNICAL FIELD

The present invention relates to storage control in a file server system including a plurality of file servers.

BACKGROUND ART

PTL 1 describes a remote (for instance, back-end) file server (hereinafter referred to as the "core server"), and a local (for instance, front-end) file server (hereinafter referred to as the "edge server") that is connected to the core server via a communication network.

In PTL 1, a user of the edge server reads a file into the edge server from the core server via the communication network, and updates the file read into the edge server. Subsequently, the edge server copies the updated file from the edge server to the core server, and stubs that file in the edge server. In other words, the file is migrated from the edge server to the core server. Subsequently, when the user accesses the stub (stubbed file), the edge server reads, from the core server, the file corresponding to the stub.

CITATION LIST

Patent Literature

[PTL 1]
Description of U.S. Patent Application Publication No. 2012/0016838

SUMMARY OF INVENTION

Technical Problem

The problematic points of a file server system including a plurality of edge servers that have a plurality of home directories associated with one core space are now examined. The term "core space" as used herein refers to a file system (name space) of the core server, and the term "home directory" as used herein refers to a file system (name space) that is used by the user of the edge server.

For example, let it be assumed that a file in a first home directory of a first edge server is updated. Let it further be assumed that, subsequently, a failure occurred in the communication between the first edge server and the core server (for example, a failure in the communication network connecting the first edge server and the core server) before the updated file is migrated to the core space. In the foregoing case, the first edge server cannot read, from the core space, the file corresponding to the stub in the first home directory.

Thus, the user may use, in substitute for the first home directory, a second home directory of a second edge server which corresponds to the core space corresponding to the first home directory. The user can acquire a file, which is the file before the updated file was updated, from the core space through the second home directory, and update that file. The second edge server migrates the updated file from the second home directory to the core space.

Subsequently, after the communication failure of the first edge server and the core server is recovered, the first edge server can migrate the updated file, which has not yet been migrated, from the first home directory to the core space.

Nevertheless, in such a case, a reversion of the file will occur in the core space. In other words, the latest file that was migrated from the second edge server will be overwritten by an old file that was updated before that file.

The reversion of a file in the core space is not limited to cases of a communication failure between the first edge server and the core server, and may also occur in cases where the second home directory used in substitute for the first home directory before the file that was updated in the first home directory is copied to the core space, and the first home directory is subsequently used in substitute for the second home directory.

In other words, an object of this invention is to prevent the reversion of files and provide the latest file to the user.

Solution to Problem

A first edge server which is configured to provide a first home directory performs preventive processing of preventing a first file in a first home directory from overwriting a second file in a core space prior to coping an update of the first home directory to the core space. The second file is a file that has been updated in a second home directory and copied to the core space. The first file is a file that corresponds to the second file and that has been updated in the first home directory and has not been copied to the core space. The first file may be a file having the same identifying information (for instance, UUID (Universally Unique Identifier)), as the second file.

DESCRIPTION OF EMBODIMENTS

Several Examples are now explained.

Note that, in the ensuing explanation, while various types of information may be explained in the form of "xxx table", the various types of information may also be expressed using a data structure other than a table. An "xxx table" may be referred to as "xxx information" in order to indicate that information is not dependent on a data structure.

Moreover, in the ensuing explanation, while processing may be explained with the term "program" as the subject, since a program performs predetermined processing by being executed by a processor (for instance, a CPU (Central Processing Unit)) while using a storage resource (for instance, a memory) and/or a communication interface apparatus (for instance, a communication port) as needed, the subject of processing may also be a processor. The processing that is explained with the term "program" as the subject may also be the processing that is performed by a file server (for instance, the edge server or the core server described later). Moreover, the processor may include a hardware circuit which performs a part or all of the processing to be performed by the processor. A computer program may be installed in the respective computers from a program source. A program source may be, for example, a program distribution server or a storage media.

Example 1

Figure 1:
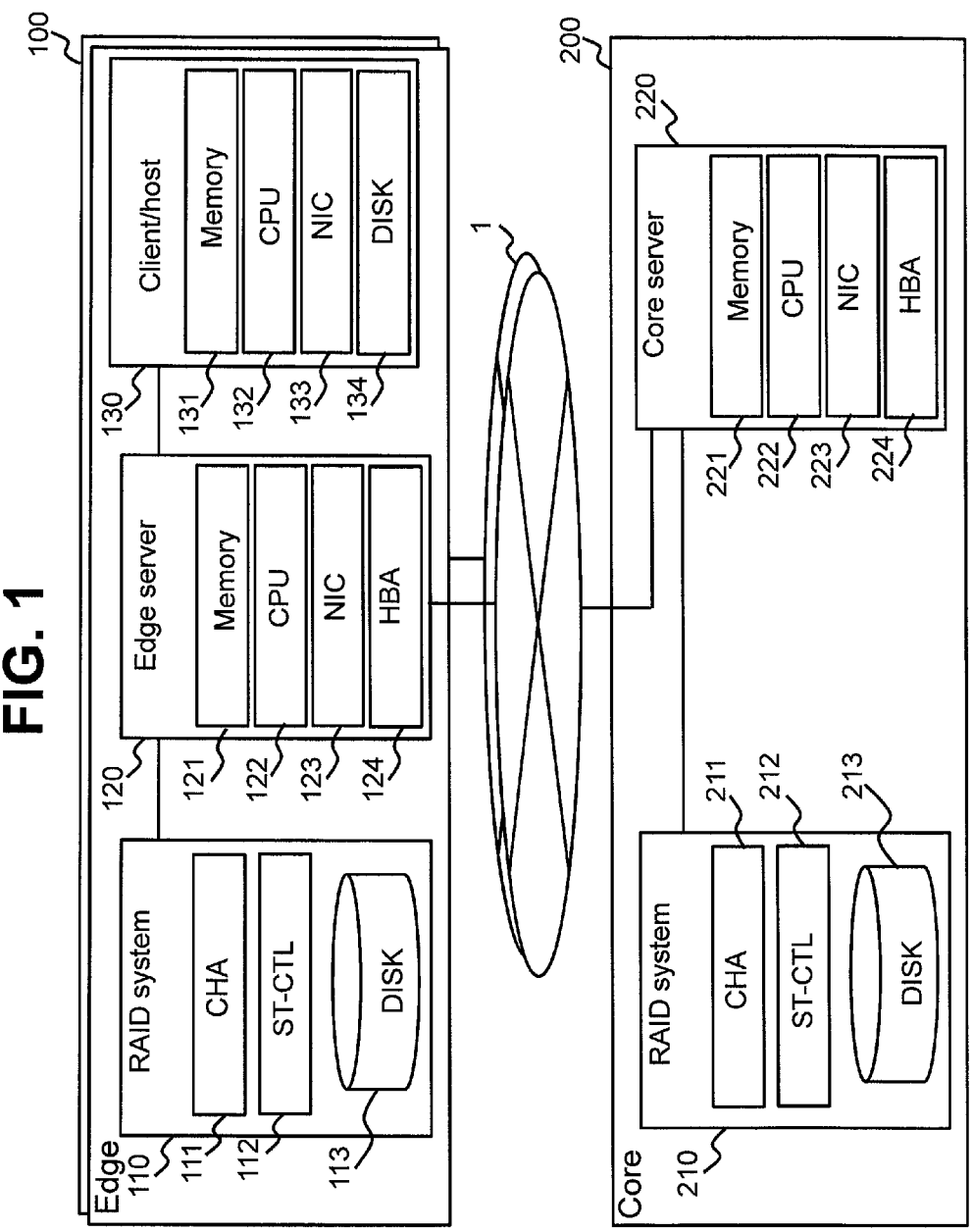
FIG. 1 shows the hardware configuration of the overall file server system according to Example 1.

FIG. 1 shows the hardware configuration of the overall file server system according to Example 1.

The file server system is configured from an edge 100 and a core 200. The edge 100 and the core 200 are mutually connected via a communication network 1.

The edge 100 is a base including a local computer system and, for example, is a base such as a branch office or a business office where a user actually conducts business. Moreover, the core 200 is a base including a remote computer system and, for example, is a base for collectively managing servers and storage apparatuses, or a base for providing cloud services.

Note that, while only one core 200 is shown in the illustrated example, a plurality of cores 200 may also be used. Regardless of whether one core 200 or a plurality of cores 200 is used, the present invention can be applied to file server systems in general so as long as the same core space (file system space (name space) provided by the core server 220 in the core 200) is associated with a plurality of home directories (file system space for users) of a plurality of edge servers 120 in a plurality of edges 100.

Moreover, while the diagrams illustrate one client or host (client/host) 130 connected to the edge server 120, a plurality of clients/hosts 130 may also be connected to the edge server 120. Moreover, one client/host 130 may be connected to a plurality of edge servers 120 via one or more communication networks.

The edge 100 comprises a RAID system 110, an edge server 120, and a client/host 130.

The edge server 120 is an example of a file server (for example, a file storage apparatus) in the edge 100 and, for example, is connected to the client/host 130 via a communication network (for example, a LAN (Local Area Network)). Moreover, the edge server 120 is connected to a RAID system 110, for example, via a communication network (for example, a SAN (Storage Area Network)).

The RAID system 110 is broadly classified into a controller unit and a storage unit. The controller unit comprises a CHA (Channel Adaptor) 111, and a storage controller (hereinafter referred to as the "ST-CTL") 112. The storage unit comprises a DISK 113. The CHA 111 and the DISK 113 are connected to the ST-CTL 112. The CHA 111 is a communication interface device connected to the edge server 120. The ST-CTL 112 is a controller. The DISK 113 is a disk-type physical storage device (for example, an HDD (Hard Disk Drive)). As the physical storage device, a different type of physical storage device (for example, a flash memory device) may also be adopted. Moreover, in the illustrated example, while the RAID system 110 only comprises one DISK 113, in reality the RAID system 110 comprises a plurality of DISKs 113. One or more RAID groups are configured from a plurality of DISKs 113.

The RAID system 110 receives, with the CHA 111, a block level I/O request sent from the edge server 120, and executes I/O to the appropriate DISK 113 based on the control of the ST-CTL 112.

The edge server 120 comprises a memory 121, a CPU (Central Processing Unit) 122, an NIC (Network Interface Card) 123, and an HBA (Host Bus Adaptor) 124. The memory 121, the NIC 123 and the HBA 124 are connected to the CPU 122.

The NIC 123 is a communication interface device that communicates with the core server 220 and the client/host 130. A plurality of NICs 123 of each of the plurality of edge servers 120 may also communicate with the same core server 220 via a plurality of communication networks 1.

The HBA 124 is a communication interface device that communicates with the RAID system 110.

The memory 121 is a storage area (for example, a RAM (Random Access Memory) or a ROM (Read Only Memory)) to and from which the CPU 122 directly write and read. The edge server 120 reads the program (for example, an OS (Operating System)) for controlling the edge server 120 into the memory 121, and causes the CPU 122 to execute that program. The edge server 120 may also include a different type of storage resource in addition to or in substitute for the memory 121.

The edge server 120 receives a file level I/O request from the client/host 130 via the NIC 123. The edge server 120 creates an I/O request (block level I/O request) of an I/O of the data blocks configuring the file that is designated in that I/O request. The edge server 120 sends the block level I/O request to the RAID system 110 via the HBA 124.

The client/host 130 is a computer, and comprises a memory 131, a CPU 132, an NIC 133, and a DISK 134. The client/host 130 may also include a different type of storage resource in addition to or in substitute for the memory 131 and/or the DISK 134.

The client/host 130 reads the program (program (for example, an OS) for controlling the client/host 134) stored in the DISK 134 into the memory 131, and causes the CPU 132 to execute the program. Moreover, the client/host 130 sends the file level I/O request to the edge server 120 via the NIC 133.

The core 200 comprises a RAID system 210 and a core server 220. The core server 220 is connected to the RAID system 210, for example, via a communication network.

The RAID system 210 comprises a CHA 211, an ST-CTL 212, and a DISK 213. In the diagrams, the configuration of the RAID system 210 and the configuration of the RAID system 110 are substantially the same. Accordingly, the RAID system 210 receives, with the CHA 211, the block level I/O request that was sent from the core server 220, and executes I/O to the appropriate DISK 213 based on the control of the ST-CTL 212. Note that the configuration of the RAID system 210 and the configuration of the RAID system 110 may be different.

The core server 220 is an example of a file server (for example, an archive apparatus) in the core 200, and comprises a memory 221, a CPU 222, an NIC 223, and an HBA 224. A different type of storage resource may also be provided in substitute for or in addition to the memory 221. The core server 220 reads a program (for example, an OS) for controlling the core server 220 into the memory 221, and causes the CPU 222 to execute that program. Moreover, the core server 220 communicates with the edge server 120 via the NIC 223 and the communication network 1. The core server 220 is connected via the HBA 224, and performs access in block units.

In this Example, one core server 220 is connected to a plurality of physical or logical communication networks 1 to which the plurality of edge servers 120 are respectively connected.

Nevertheless, the communication network may also be common for the plurality of edge servers 120.

Figure 2:
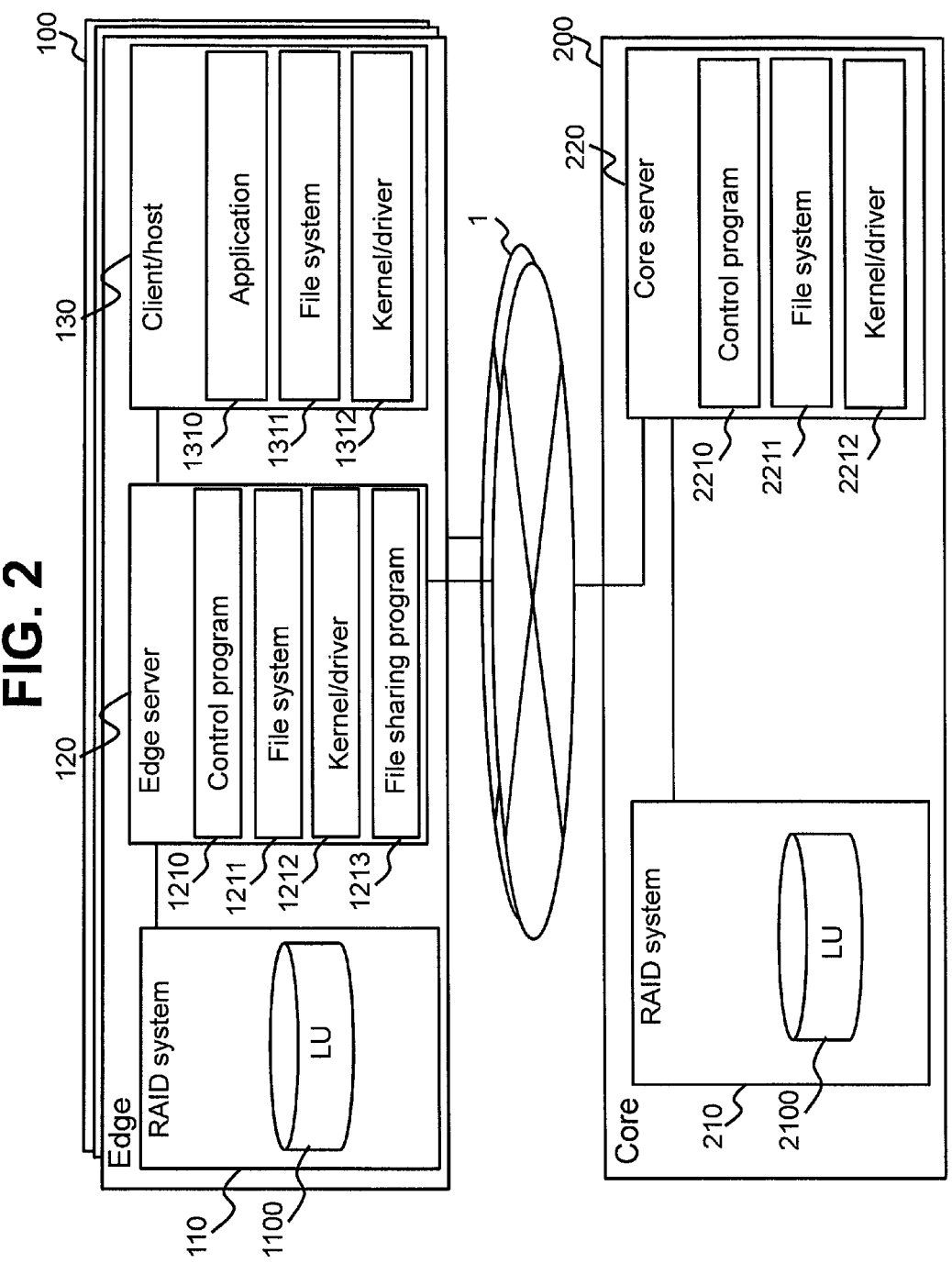
FIG. 2 shows the software configuration of the overall file server system according to Example 1.

FIG. 2 shows the software configuration of the overall file server system according to Example 1.

The RAID system 110 (210) includes a plurality of LUs (Logical Units) 1100 (2100). The LU 1100 (2100) is a logical storage device. The LU 1100 (2100) may be a tangible LU based on one or more DISKs 113 (213), or a virtual LU according to Thin Provisioning, or an LU that is created as a result of an external storage resource being virtualized according to storage virtualization technology.

The LU 1100 (2100) is configured from a plurality of blocks (storage areas). Files are stored in the LU 1100 (2100). Moreover, all or a part of the file system information described later may also be stored in the LU 1100 (2100).

The memory 121 of the edge server 120 (memory 221 of the core server 220) stores a control program 1210 (2210), a file system 1211 (2211), and a kernel/driver 1212 (2212). The memory 121 of the edge server 120 additionally stores a file sharing program 1213. In the ensuing explanation, the control program in the edge server 120 is referred to as the "edge control program", and the control program in the core server 220 is referred to as the "core control program", and these are collectively referred to as the "control program" when there is no need to particularly differentiate the two. Files are exchanged between the edge server 120 and the core server 220 via the edge control program 1210 and the core control program 2210.

The edge control program 1210 reads the file to be copied from the LU 1100 of the RAID system 110, and transfers the read file to the core server 220. The core control program 2210 receives the file to be copied from the edge server 120, and writes the received file in the LU 2100 of the RAID system 210.

Moreover, the edge control program 1210 deletes the copied file (strictly speaking, the substance of the copied file) in the LU 1100 when a certain predetermined condition is satisfied, and thereby realizes the substantial migration of the copied file.

Subsequently, when the edge control program 1210 receives a read request from the client/host 130 for reading a stub (metadata) of the deleted file, the edge control program 1210 acquires, for example, from the LU 2100, the file that is linked to the stub via the core control program 2210, and sends the acquired file to the client/host 130.

Note that, in this Example, the term "stub" refers to an object (metadata) that is associated with the storage destination information of the file (information indicating the link destination). The client/host 130 does not know whether it is a file or a stub.

Figures 3, 4:
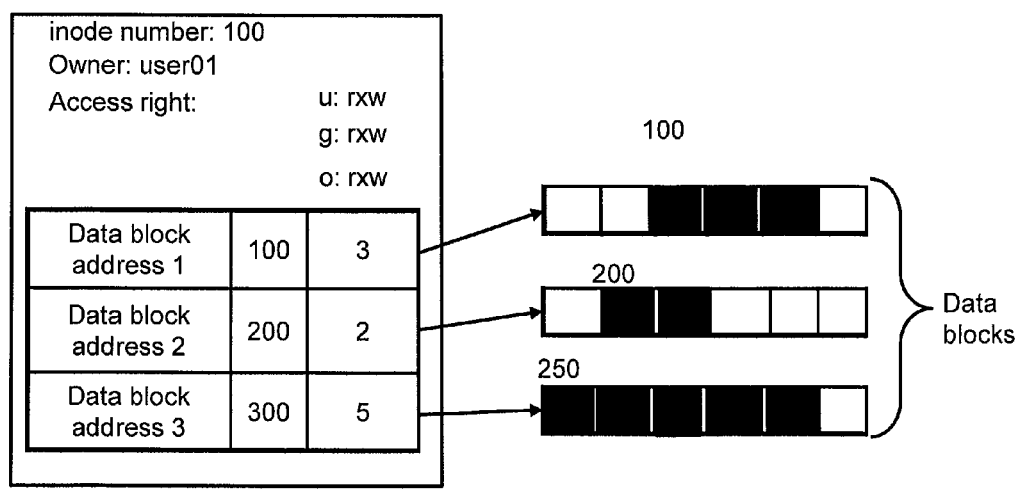
FIG. 3 shows the inode management table.
FIG. 4 shows the relation of the inode of inode number "100" in the inode management table of FIG. 3, and the location of the files.

The file system 1211 (2211) is a file system program, and manages the file system information. The file system information includes information related to the respective files (for example, information indicating the size and location of the file). Specifically, for example, the file system information includes an inode management table 300 shown in FIG. 3. The inode management table 300 is configured from a plurality of inodes (one line corresponds to one inode). Each inode is configured from a plurality of metadata. As the type of metadata, there are, for example, owner of the file, access right of the file, file size, and storage location of the file (data block address 1, 2, 3, For example, according to a line including the inode number "100", the file can be configured from data stored in the following blocks (blocks in the LU) as shown in FIG. 4.

(*) Data in 3 consecutive blocks (block group identified from the data block address "100-3") with the block of the address 100 as the initial block.

(*) Data in 2 consecutive blocks (block group identified from the data block address 2 "200-2") with the block of the address 200 as the initial block.

(*) Data in 5 consecutive blocks (block group identified from the data block address 3 "250-5") with the block of the address 250 as the initial block.

Returning once again to FIG. 2, the kernel/driver 1212 (2121) performs overall control and hardware-specific control such as scheduling control of a plurality of programs (processes) running on the edge server 120 (core server 220) and handling of interruptions from the hardware.

The file sharing program 1213 is a program that uses a communication protocol such as CIFS (Common Internet File System) or NFS (Network File System) and provides a file sharing service to the client/host 130.

The memory 131 of the client/host 130 stores an application 1310, a file system 1311, and a kernel/driver 1312.

The application 1310 is software (application program) that is used by the client/host 130 according to the intended operation. The file system 1311 and the kernel/driver 1312 are basically the same as the file system 1211 (2211) and the kernel/driver 1212 (2212) described above.

Figure 24:
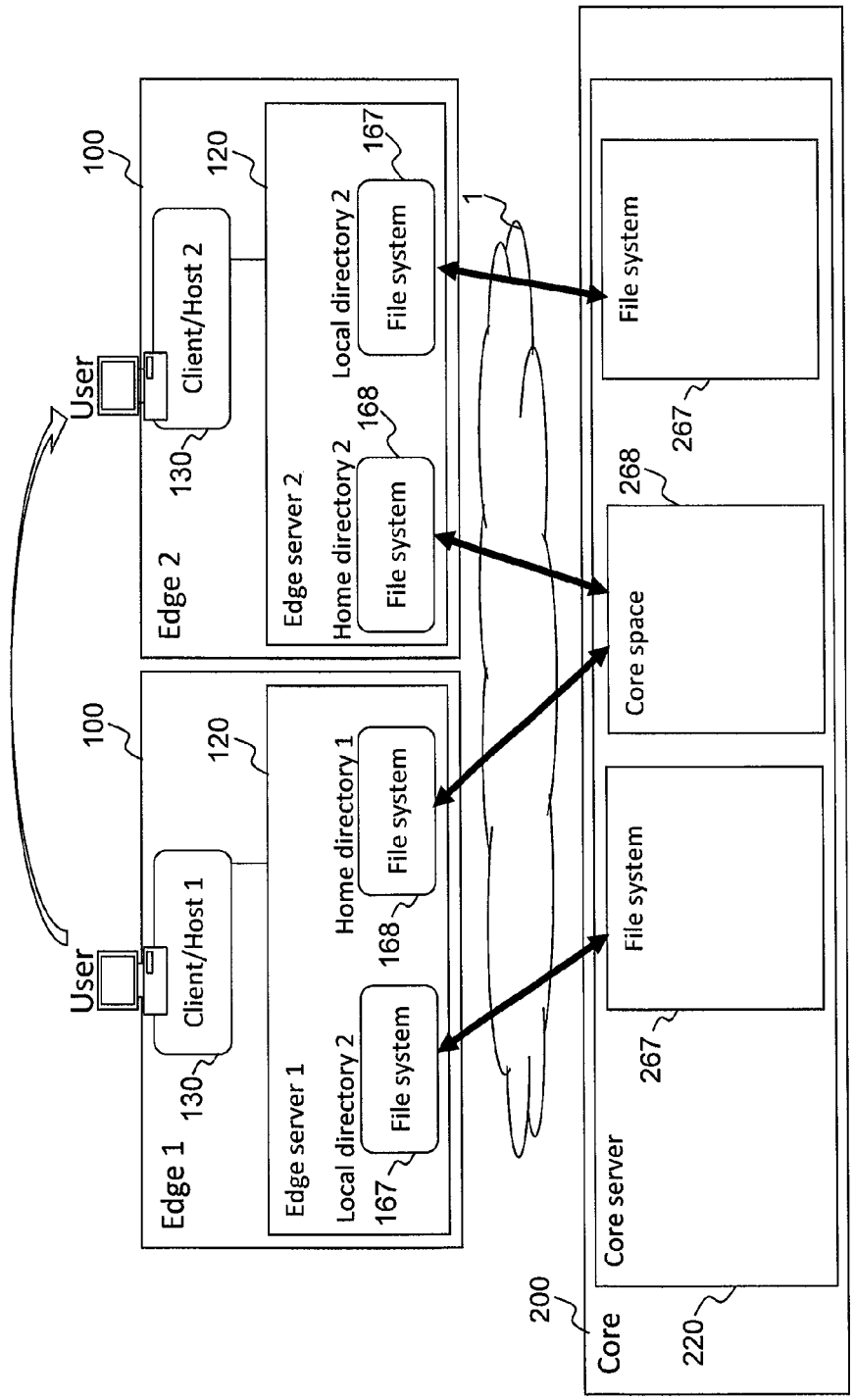
FIG. 24 shows that the plurality of home directories in the plurality of file servers correspond to the same core space in Example 1.

FIG. 24 shows that the plurality of home directories in the plurality of file servers correspond to the same core space in Example 1.

The edge servers 1 and 2 (120) include home directories 1 and 2 (168). The home directory 1 (2) is a file system space (name space) for the user that is provided in the edge server 1 (2). The edge server 1 (2) provides the home directory 1 (2) to the client/host 1 (2) that is used by the user. The client/host 1 (2) can add files to the home directory 1 (2), update the files in the home directory 1 (2), and delete files from the home directory 1 (2).

The plurality of home directories 1 and 2 are associated with one core space 268. The core space 268 is a file system space (name space) for the home directory provided in the core server 220. Note that, since the home directories 1 and 2 are associated with one core space, while the home directories can be recognized to be the same from the user, for the sake of facilitating the explanation, these home directories are differentiated.

When the home directory 1 is updated (addition of file, update of file, deletion of file) by the edge server 1, the update is reflected in the core space 268, the update of the core space 268 based on that reflection is reflected in the home directory 2 of the edge server 2, and the home directory 2 is consequently updated. For example, when a file X is added to the home directory 1, the file X is migrated from the home directory 1 to the core space 268, and the file X is copied from the core space 268 to the home directory 2.

Similarly, the update of the home directory 2 (addition of file, update of file, deletion of file) by the edge server 2, the update is reflected in the core space 268, the update of the core space 268 based on that reflection is reflected in the home directory 1 of the edge server 1, and the home directory 1 is consequently updated. For example, when a file X in the home directory 2 is updated, the updated file X is migrated from the home directory 2 to the core space 268, and the updated file X is copied from the core space 268 to the home directory 1.

Note that at least one edge server 120 may include a local directory 167 separately from the home directory 168. The local directory 167 is a file system space in which the file system space (name space) 267 of the core server 220 corresponds only to itself. The update performed in the local directory 167 may be reflected only in the file system space (name space of the core server 220) 267 corresponding to that local directory 167.

The memory 121 of the edge server 120 stores a rename list and an update list, respectively. The rename list and the update list in the edge server 120 exist for each home directory of that edge server 120.

Figure 9:
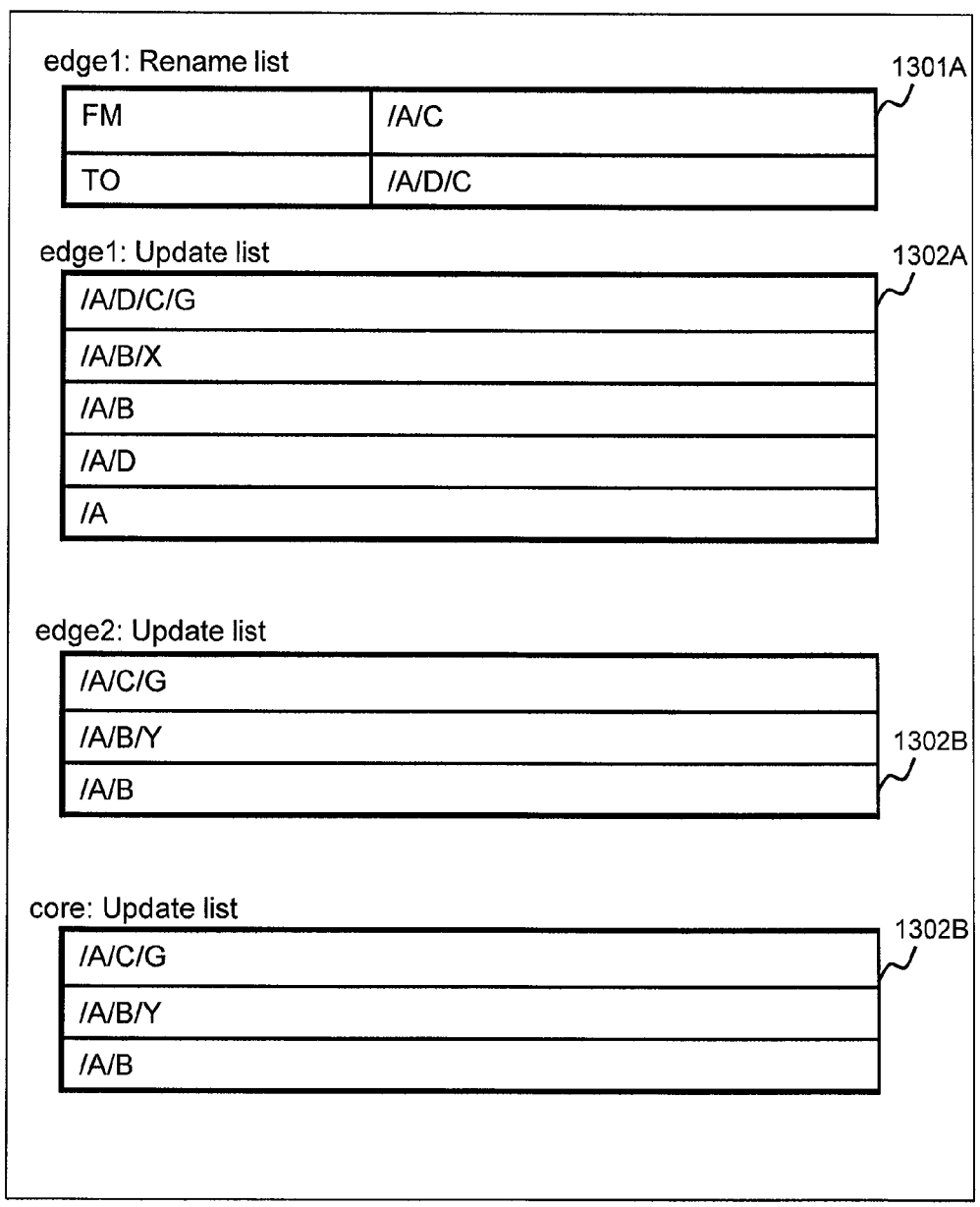
FIG. 9 shows the rename list and the update list in Example 1.

A rename list is a list of path names before the update and path names after the update regarding the paths that were updated in the home directory 168. Specifically, for example, as shown in FIG. 9, the rename list 1301A of the edge server 1 corresponding to the home directory 1 (including the rename list not shown of the edge server 2) includes the items of "FM" and "TO" for each updated path. "FM" indicates the path name (path structure) before the update, and "TO" indicates the path name after the update. The rename list stores a path name (path structure) that has not been reflected (migrated) in the core space after being updated. Note that, in this Example, the core server 220 assigns a UUID (Universally Unique Identifier), as the identifying information of the file, to the file in the core space. The UUID of the file in the core space is provided to the edge servers 1 and 2 of the home directories 1 and 2 corresponding to that core space. The edge servers 1 and 2 can identify the UUID of the file from the path name of that file. Nevertheless, the edge servers 1 and 2 cannot identify the path name of the file from the UUID of that file.

An update list is a list of identifying information of the files that were updated in the home directory 168. Identifying information is, for example, a path name. Specifically, for example, as shown in FIG. 9, the update list 1302A of the edge server 1 corresponding to the home directory 1 (as well as the update list 1302B of the edge server 2) registers the path name of the files that were updated but were not migrated to the core space among the files stored in the home directory 1 (2). The update list records the path name of the files that were updated but not migrated to the core space.

Each time a file is migrated from the home directory 1 (2) to the core space, the rename list 1301A and the update list 1302A (1302B) are sent to the core server 220. According to the example of FIG. 9, the file is migrated from the home directory 2 to the core space, the update list 1302B (and the rename list not shown) is sent from the edge server 2 to the core server 220, and the update list 1302B (and the rename list) is stored in the memory 221 of the core server 220. Subsequently, the update list 1302B (and the rename list) becomes an initial state (for instance, blank) and, when the home directory 2 is updated, at least one of either the update list 1302B or the rename list is updated.

The edge server 1 (2) can determine whether a file that was updated in the home directory 2 (1) exists in the core space by using at least the update list of either the rename list or the update list from the edge server 2 (1) received by the core server 220. In this Example, the reversion of a file; that is, a file that was updated in the home directory 2 (1) and migrated to the core space being overwritten by an old file that was updated in the home directory 1 (2) earlier than that file, will not occur. Note that a sequential number is associated with the update list and the rename list, respectively, and the edge server increments the sequential number of the file by one each time the update list and the rename list are sent to the core server.

Foremost, as the Comparative Example of this Example, an example of the source that causes the reversion of a file in the core space is explained, and the various types of processing that are performed in this Example are subsequently explained.

Figure 5:
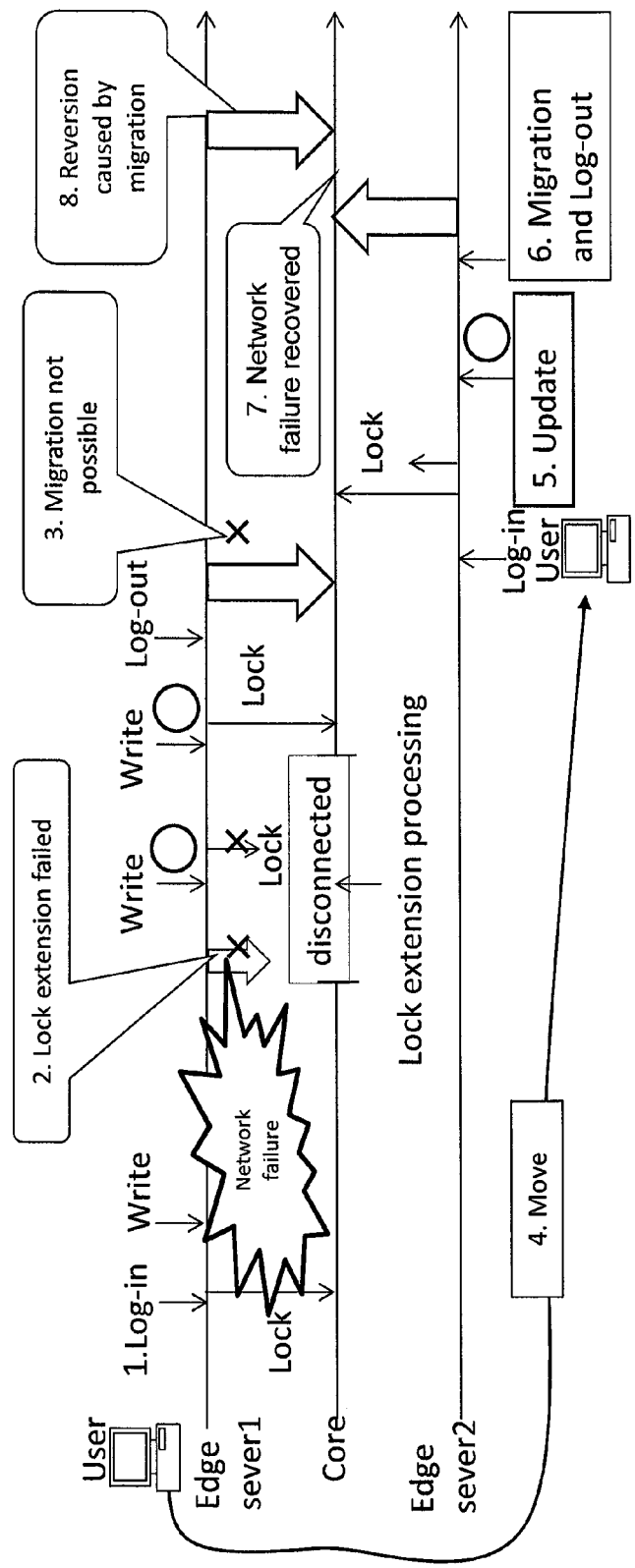
FIG. 5 is a schematic diagram explaining an example of the source that causes the reversion of a file in the core space in the Comparative Example of Example 1.

FIG. 5 is a schematic diagram explaining an example of the source that causes the reversion of a file in the core space in the Comparative Example of this Example. Note that, in this Comparative Example also, let it be assumed that the home directory 1 of the edge server 1 and the home directory 2 of the edge server 2 are associated with one core space.

Regarding 1

The edge server 1 permits the user's log-in to the home directory 1. In addition, the edge server 1 locks the core space. Consequently, no edge server other than the edge server 1 can write files in the core space (however, files can be read from the core space). In a state where the core space is locked, the edge server 1 reads at least the user's intended file (hereinafter referred to as the "old file T") from the core space into the home directory 1, and updates the read old file T to a new file T1. At this time point, the edge server 1 has not yet migrated the new file T1 to the core space.

Note that the core server can make inquiries to the locked edge server with regard to whether the lock should be periodically extended (hereinafter referred to as the "extension inquiry"). In addition, when the edge server receives an extension inquiry, the edge server replies to the core server on whether to extend the lock.

Regarding 2

A failure occurs in the communication network (hereinafter referred to as the "first communication network") between the edge server 1 and the core server. When a failure occurs in the first communication network, the core server can no longer receive a reply to the extension inquiry from the edge server 1. In the foregoing case, the core server unlocks the core space that was locked by the edge server 1. Note that, in this Example, as an example of the communication failure between the edge server and the core server, while a failure of the communication network is explained as described above, even if another type of communication failure (for example, a failure in the NIC of at least either the edge server or the core server) occurs between the edge server and the core server, there may be cases where the edge server 1 is also unable to receive an extension inquiry from the core server, or the core server is unable to receive a reply to the extension inquiry from the edge server 1.

Regarding 3

When a failure occurs in the first communication network, the edge server 1 cannot migrate the new file T1 to the core space.

Regarding 4

The user relatively moves from the edge server 1 to the edge server 2. Specifically, the user logs out from the home directory 1 and logs into the edge server 2. The edge server 2 locks the core space via the communication network (second communication network) which connects the edge server 2 and the core server. Consequently, no edge server other than the edge server 2 can write files into the core space.

Regarding 5

The edge server 2 reads the file T from the core space to the home directory 2. In other words, the file read by the edge server 2 is the file (old file) T before being updated in the edge server 1. This is because the new file T1 of the edge server 1 has not been migrated to the core space due to a failure in the first communication network that occurred before the new file T1 was migrated to the core space. After reading the old file T, the edge server 2 updates the read old file T. The file T that was updated by the edge server 2 is hereinafter referred to as the "latest file T2".

Regarding 6

The edge server 2 migrates the latest file T2 to the core space. Subsequently, the user logs out from the home directory 2. When the user logs out from the home directory 2, the core server unlocks the core space that was locked by the edge server 2. This is because, when the user logs out from the home directory 2, the edge server 2 will reply to not extend the lock in response to the extension inquiry from the core server. Upon receiving the reply of not extending the lock, the core server unlocks the locked core space.

Regarding 7

The failure of the first communication network is recovered.

Regarding 8

Subsequently, the edge server 1 migrates the new file T1 from the home directory 1 to the core space.

Based on the foregoing flow, the reversion of the latest file T2 from the edge server 2 being overwritten by the new file T1 of the edge server 1 in the core space will occur.

In this Example, a scheme for avoiding this kind of reversion is provided.

The outline of one processing flow of this Example is now explained with reference to FIG. 6 to FIG. 8. Note that, in FIG. 6 to FIG. 8, the tree structures within the frame of the edge 1, the core and the edge 2 are respectively the tree structures of the home directory 1, the core space and the home directory 2. Moreover, the icon of the directory type indicates the home directory or the directory in the core space. Moreover, the icon of the file type indicates the file (or the stub corresponding to that file). Moreover, the white star mark indicates an update or addition in the home directory 1. Moreover, the black star mark indicates an update or addition in the home directory 2. Here, an updated directory is the directory to which a subordinate file or a subordinate directory has been added, or a directory from which a subordinate file or a subordinate directory has been deleted. A "subordinate file" and a "subordinate directory" of a directory is a file or a directory located in the subordinate of the directory and which is a file or a directory that can be directly accessed from the target directory (without having to go through a separate directory). Moreover, the key mark in the edge server indicates that the lock flag is ON in the home directory, and the key mark in the core server indicates that the core space is locked. The edge server turns ON the lock flag regarding the home directory corresponding to the core space so that the edge server can recognize that the core space has been locked. Consequently, the edge server can determine that the core space is locked without having to make an inquiry to the core server on whether the core space is locked.

Figure 6:
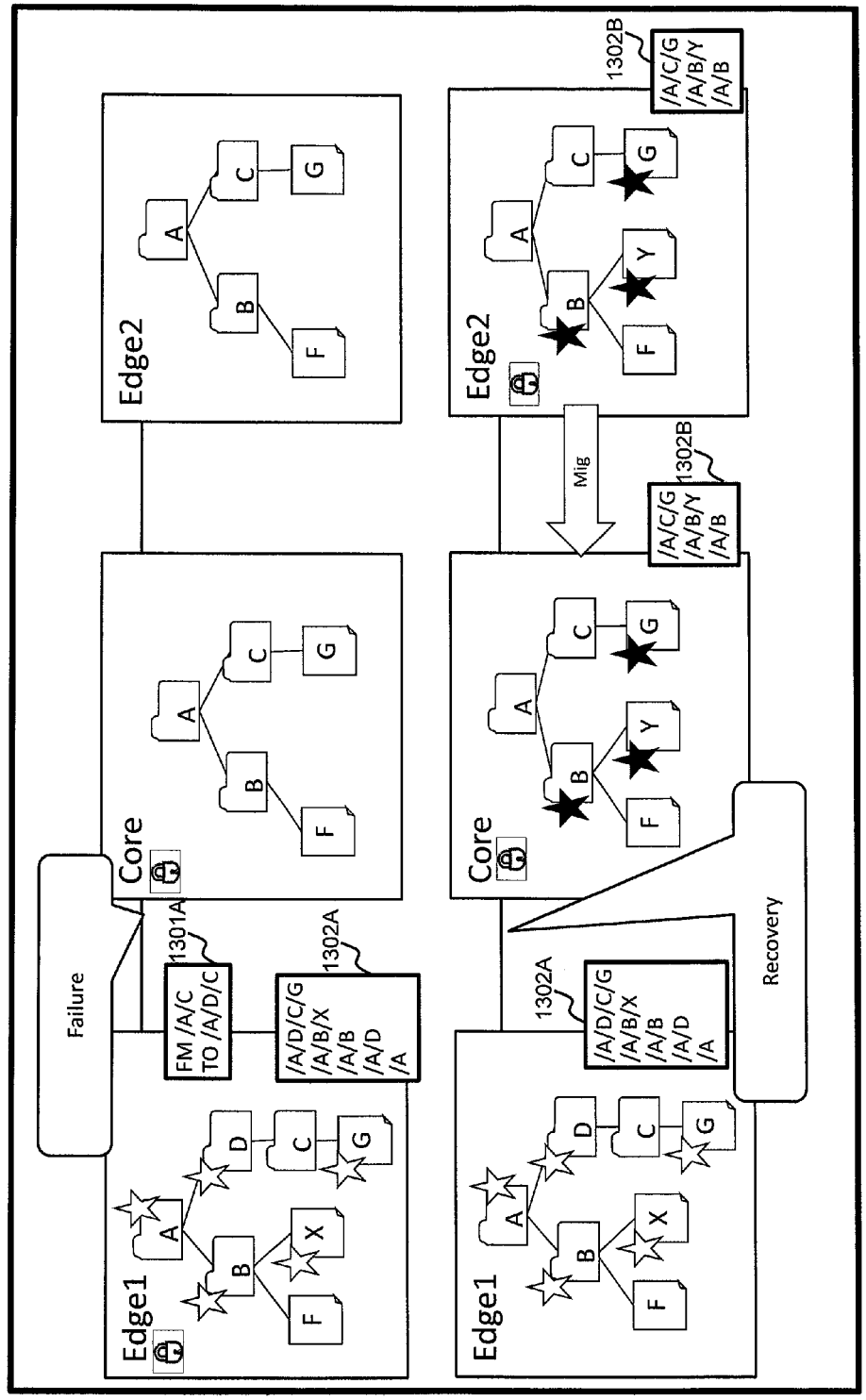
FIG. 6 is a schematic diagram showing an example of the flow from the occurrence of a network failure to the recovery of the network failure in Example 1.

As shown in the upper row of FIG. 6, let it be assumed that the edge server 1 has locked the core space before a failure occurred in the first communication network and, as shown in the lists 1301A and 1302A (refer to FIG. 9), the path name "/A/C" has been updated to the path name "/A/D/C", and the files "X" and "G" have been updated. When a failure occurs in the first communication network, the user logs out from the home directory 1 and logs into the home directory 2 and the core space is unlocked, but the tree structure of the home directory 2 is the same as the tree structure of the core space at the time point when the failure occurred in the first communication network.

As shown in the lower row of FIG. 6, let it be assumed that the edge server 2 locked the core space, a subordinate file "Y" was added to the directory "B" in the home directory 2, and the subordinate file "G" of the directory "C" was updated. Consequently, the edge server 2 records "/A/C/G", "/A/B/Y" and "/A/B" in the update list 1302B (refer to the lower row of FIG. 6 and FIG. 9).

The edge server 2 migrates the files "Y" and "G" that were updated in the home directory 2 to the core space. Moreover, the edge server 2 sends the update list 1302B and the rename list (not shown) of the home directory 2 to the core server. Consequently, as shown in the lower row of FIG. 6 and FIG. 9, the core server can receive the update list 1302B and the rename list (not shown) of the home directory 2.

Subsequently, let it be assumed that the failure of the first communication network has recovered. Triggered by the edge server 1 detecting the recovery of the failure of the first communication network (or triggered by the detection of a predetermined event that occurred regardless of whether the failure of the first communication network has recovered), the processing shown in FIG. 7 and FIG. 8 is performed. Note that, in the explanation made with reference to FIG. 7 and FIG. 8, the processing of the edge server may be performed as a result of the edge control program being executed, and the processing of the core server may be performed as a result of the core control program being executed.

Step 1

The edge server 1 determines whether there is an update list 1302B or a rename list from another edge server in the core server. In other words, the edge server 1 determines whether the core space has been updated by another edge server 2. Note that, in step 1, when the core server includes at least one of either the update list 1302B or the rename list, the edge server 1 may acquire the list thereof, and compare the acquired list and the lists 1301A and 1302A in its possession. Based on this comparison, it is possible to know whether there is a file (hereinafter referred to as the "conflict file") that will be subject to a reversion in the core space when the update of the home directory 1 (addition, deletion or update of the file) is reflected in the core space. When it is determined that there is a conflict file in the core space, the determination result in step 1 may be positive, and when it is determined that there is no conflict file in the core space, the determination result in step 1 may be negative.

Step 2

When the determination result in step 1 is positive, the edge server 1 adds a first directory to a predetermined location in the tree structure of the home directory 1. Specifically, for example, the edge server 1 adds a directory having the directory name of "hidden" as the subordinate directory of the route directory. In addition, the edge server 1 moves, to the created "hidden" directory, all files and directories under the route directory of the home directory 1 before the "hidden" directory was added, while maintaining the tree structure thereof. Consequently, a user using the edge server 1 can determine that the files below the "hidden" directory are the files and directories in the home directory 1 before the failure occurred in the first communication network. Note that the edge server 1 may hide at least the "hidden" directory of either the "hidden" directory or the "conflict" directory from the client/host 1.

Step 3

The edge server 1 copies all subordinate directories and subordinate files of the route directory of the core space to a predetermined location (for example, subordinate of the route directory) of the home directory 1. The edge server 1 can read the directory or file to be accessed from the core space into the home directory 1 each time access is additionally made from the client/host 1 to the subordinate via the subordinate directory from the route directory of the home directory 1. Note that, in step 3, the edge server 1 may also create, below the route directory of the home directory 1, the stub of all directories and files below the route directory of the core space.

Step 4

The edge server 1 adds a second directory to a predetermined location in the tree structure of the home directory 1. Specifically, for example, the edge server 1 adds a directory having a directory name of "conflict" as the subordinate directory of the route directory. The edge server 1 moves the file that was identified from the update list 1302A from the "hidden" directory to the "conflict" directory while maintaining the path structure. In addition, the edge server 1 migrates the "conflict" directory to the core space, and sends the rename list and the update list to the core server. With the rename list and update list that were sent above, it can be seen that the "conflict" directory has been added, and a file of path name "B/X" and a file of path name "D/C/G" have been added below the "conflict" directory. Note that, while the edge server 1 does not migrate the "hidden" directory to the core space, it may migrate the "hidden" directory to the core space.

Step 5

The core space and the home directory 2 are synchronized. The term "synchronized" as used herein refers to the files and directories with a difference from the home directory 2 in the core space being read from the core space to the home directory 2. Consequently, a file is added to the home directory 2 from the core space, the file in the home directory 2 is overwritten by a file in the core space, or a file is deleted from the home directory 2. Specifically, for example, the edge server 2 acquires the rename list and the update list of the core space from the core server and, by comparing these lists and the rename list and the update list of the home directory 2, identifies the "conflict" directory and the file of that subordinate. In addition, the edge server 2 reads the "conflict" directory and the file of that subordinate into the home directory 2. A user using the edge server 2 can determine that the file in the "conflict" directory is a file that was updated by using an edge server other than the edge server 2 before the failure occurred in the first communication network. A user using the edge server 2 can use only an arbitrary file among the files in the "conflict" directory by copying or migrating that file outside of the "conflict" directory.

The "conflict" directory that was migrated to the core space may include a file (new file) that may overwrite the file (latest file) that was updated in the core space when migrated to the core space without the "conflict" directory. Nevertheless, according to this Example, since this kind of new file is disposed below the "conflict" directory, even if this kind of new file is migrated to the core space, the latest file will not be overwritten. In other words, the reversion of a file will not occur.

The various types of processing that are performed in this Example are now explained in detail. While the edge server 1 is taken as an example in the ensuing explanation, the processing to be performed by the edge server 1 may also be similarly performed by the other respective edge servers existing in the file server system according to this Example. Moreover, in the ensuing explanation, the processing to be performed by the edge server may be performed as a result of the edge control program being executed, and the processing to be performed by the core server may be performed as a result of the core control program being executed.

Figure 10:
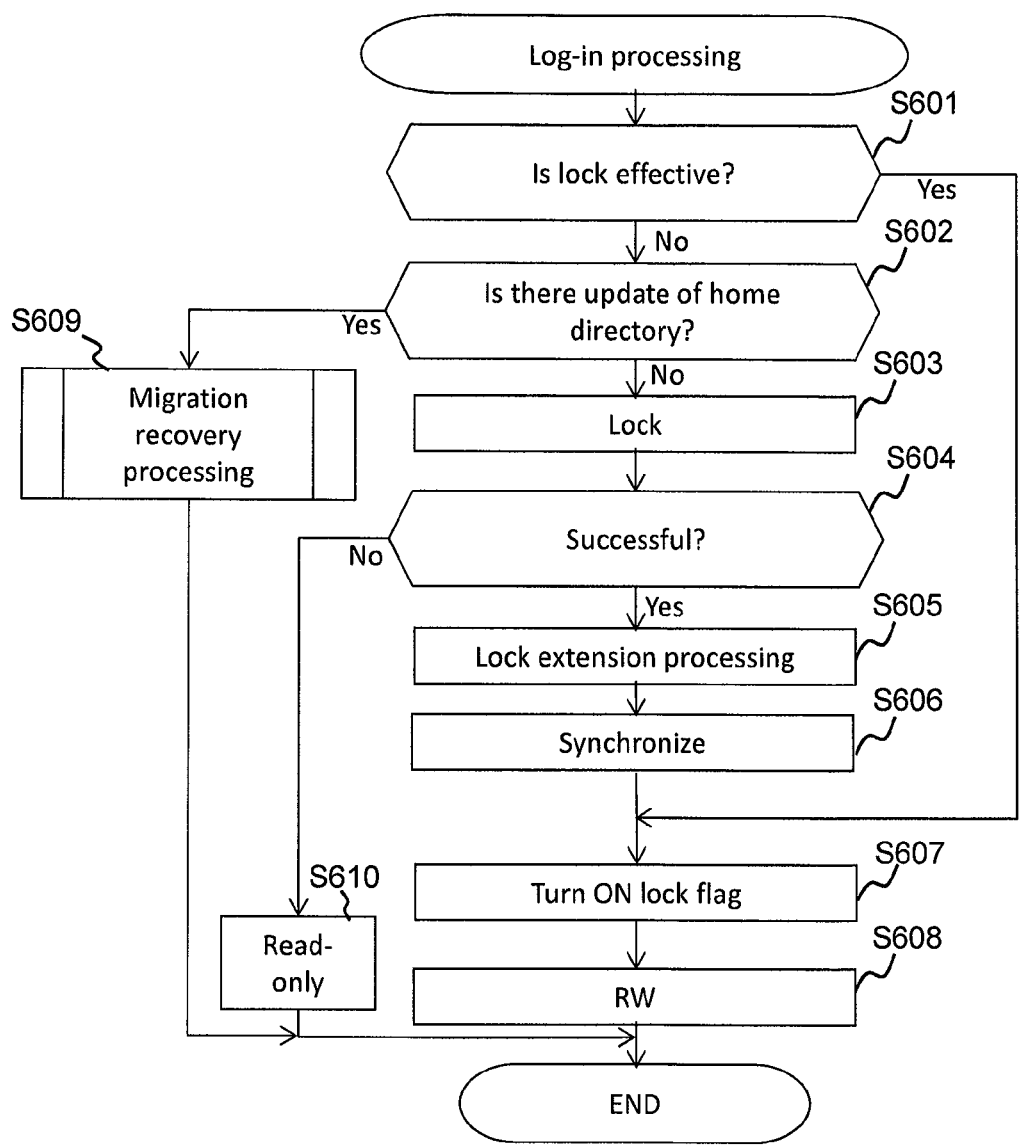
FIG. 10 is the flowchart of log-in processing.
Figure 11:
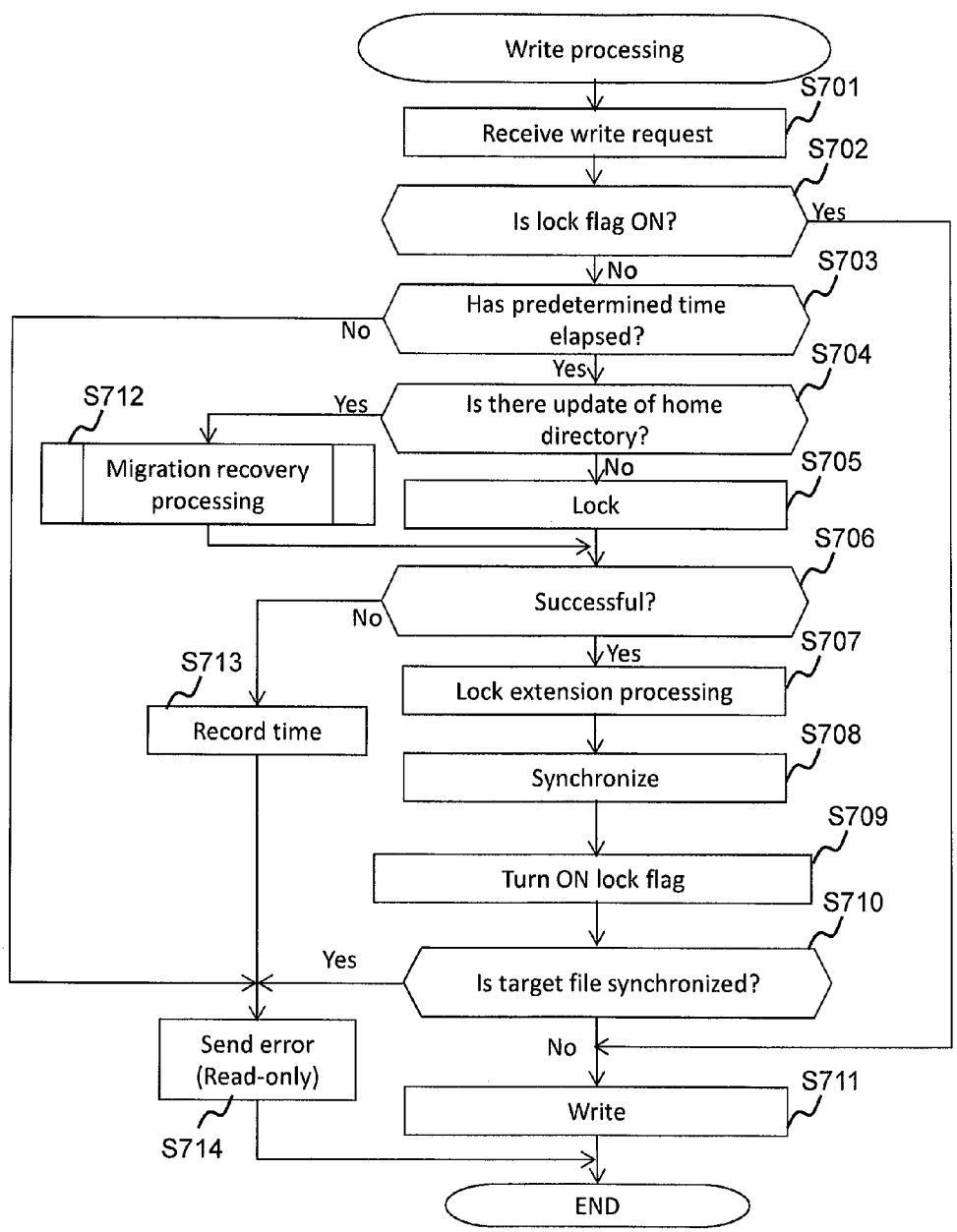
FIG. 11 is the flowchart of write processing.

FIG. 10 is the flowchart of log-in processing.

The log-in processing is performed by the edge server 1 when the edge server 1 receives a log-in request for logging into the home directory. In the ensuing explanation, the log-in destination is the home directory 1.

The edge server 1 determines whether it has locked the core space associated with the home directory 1 (whether the lock is valid or invalid) (S601). Specifically, for instance, the edge server 1 sends, to the core server 220 including the core space, an acquisition request of a lock file corresponding to the core space corresponding to the home directory 1 of the log-in destination. The core server 220 has a lock file for each core space in the memory 221 and, upon receiving an acquisition request of the lock file, sends the lock file corresponding to the core space designated in that request to the edge server 1 as the sender of that request. The edge server 1 receives the lock file, and determines whether a node number of the edge server 1 is recorded in that lock file.

When the determination result in S601 is negative (S601: No), the edge server 1 determines whether there is an update of the home directory 1 (S602). Whether there is an update of the home directory 1 is determined based on the rename list and the update list of the home directory 1.

When the determination result in S602 is positive (S602: Yes), the migration recovery processing (refer to FIG. 14) is performed.

When the determination result in S602 is negative (S602: No), the edge server 1 locks the core space (S603). Specifically, for example, the edge server 1 sends, to the core server 220, an acquisition request of the lock file designating the core space corresponding to the home directory 1 of the log-in destination. The core server sends, to the edge server 1, the lock file corresponding to the core space that is designated in the request. The edge server 1 receives the lock file. The edge server 1 records a node number of the edge server 1 in the lock file if no node number of any edge server is recorded in the lock file, and sends the lock file to the core server 220. A lock can thereby be applied.

When a lock cannot be applied (for example, when a node number of another edge server has previously been recorded in the lock file) (S604: No), the edge server 1 notifies Read-only (that is, to permit only reading with regard to the home directory 1) to the user (client/host 1 of the log-in request source) (S610). This is because, since the core space has been locked by another edge server, even if a new file is written in the home directory 1, the edge server 1 cannot migrate that file to the core space.

When a lock could be applied (S604: Yes), the lock extension processing is started (S605). Specifically, as explained with reference to FIG. 5, the edge server 1 periodically receives the lock extension inquiry from the core server 220, and replies whether to extend the lock each time it receives an inquiry.

In addition, the edge server 1 performs the file synchronization processing (S606). Specifically, the edge server 1 reads files, which are different from the files in the home directory 1, among the files in the core space, from the core space into the home directory 1. Consequently, the file in the home directory 1 is overwritten by the file that was read from the core space. Note that S606 is skipped if there is not file to be synchronized in the core space.

Subsequently, the edge server 1 turns ON the lock flag corresponding to the home directory 1 (S607). The lock flag is an example of a tool for the edge server 1 to recognize that the edge server 1 has locked the core space.

After S607, the edge server 1 notifies RW (that is, both reading and writing are permitted) to the user (client/host 1 of the log-in request source) (S608).

When the determination result in S601 is positive (S601: Yes), S607 and S608 are performed. While the lock is unlocked after the migration is performed, as the case of S601: Yes, considered may be, for example, a case of the user logging out from the home directory 1 and that user logging into the home directory 1 again before the migration from the home directory 1 is performed.

Figure 7:
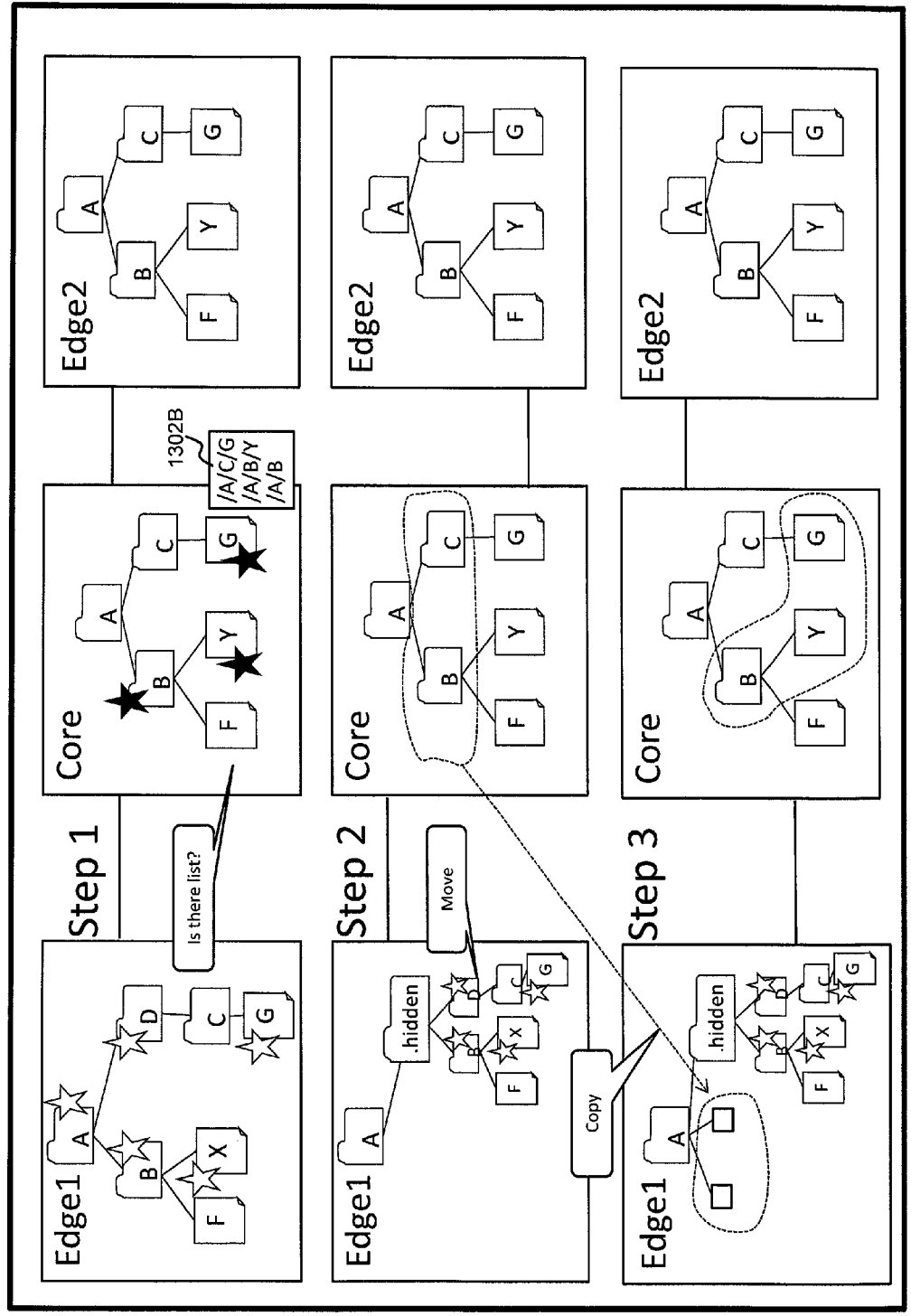
FIG. 7 is a schematic diagram showing apart of the general example of processing that is performed when the network failure is recovered in Example 1.
Figure 8:
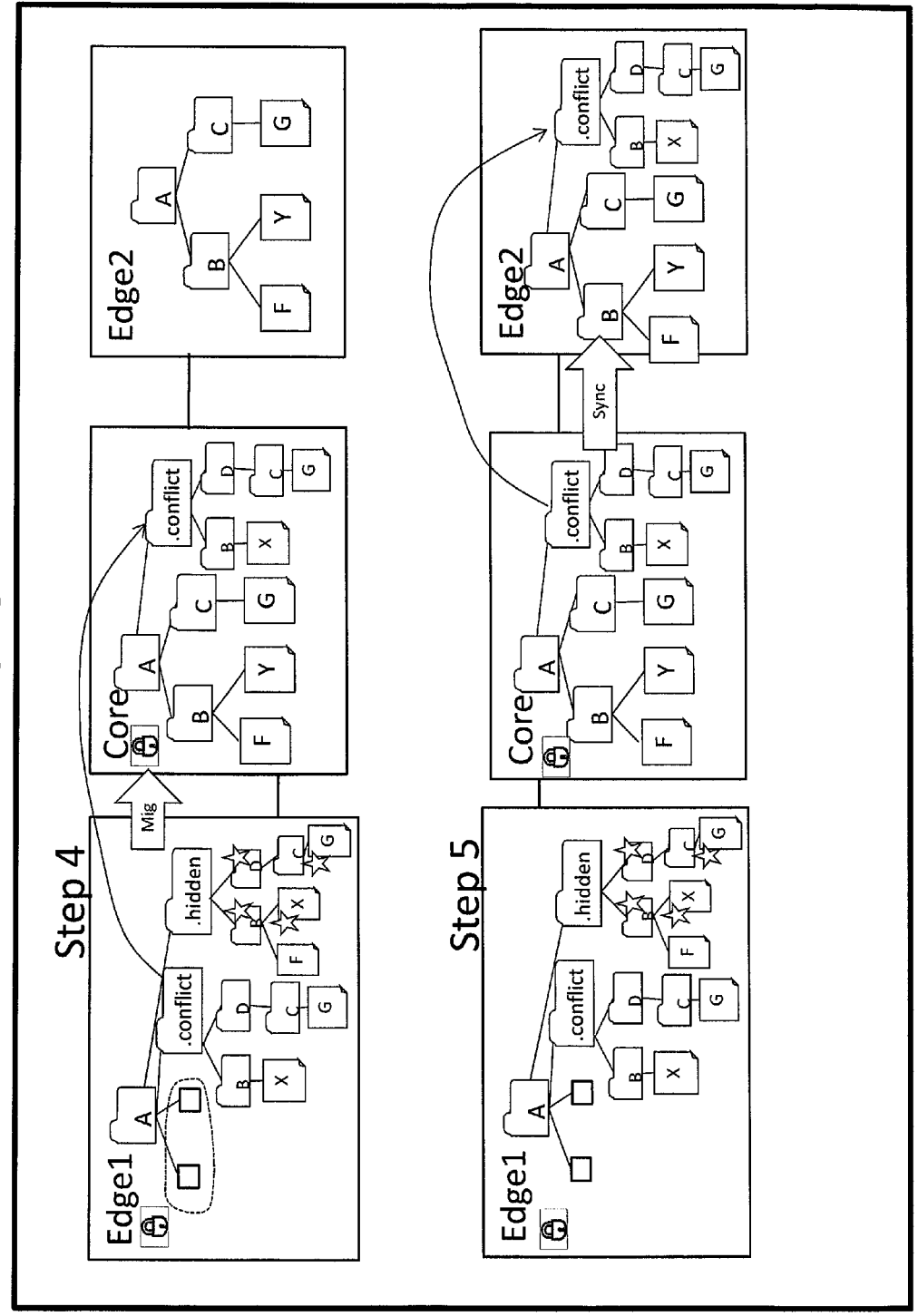
FIG. 8 is a schematic diagram showing the remainder of the general example of processing that is performed when the network failure is recovered in Example 1.

FIG. 7 is the flowchart of write processing.

The performance of write processing is triggered by the edge server 1 receiving a write request from the client/host 1. The term "write" used herein may be the update, addition or deletion of the file, or the change in the path name of the file or the directory, or the update of metadata of the file. In the ensuing explanation, "write" is the writing of a file, and specifically is the update or new writing of the file.

The edge server 1 receives, from the client/host 1, a write request of the file that designated the home directory 1 (S701).

The edge server 1 determines whether the lock flag of the home directory 1, which is designated in the received write request, is turned ON (S702).

When the determination result in S702 is positive (S702: Yes), the edge server 1 writes the file in the home directory 1 according to the write request (S711). Moreover, the edge server 1 updates the update list 1302A or the rename list 1301A corresponding to the home directory 1.

When the determination result in S702 is negative (S702: No), the edge server 1 determines whether the elapsed time from the time that the processing of locking the core space has failed (elapsed time from the time recorded in S713 described later) has elapsed a predetermined time (for example, 10 minutes) (S703). Note that the reason why a predetermined time is set is in order to collectively reflect the updates and prevent the edge server 1 from frequently performing the processing of locking the core space.

When the determination result in S703 is negative (S703: No), the edge server 1 replies an error (Read-Only) to the client/host 1 (S714).

When the determination result in S703 is positive (S703: Yes), the edge server 1 determines whether there is an update of the home directory 1 (S704). S704 is specifically the same processing as S602 of FIG. 10. Since S704 is performed when S703 is Yes, the load of the edge server 1 can be alleviated in comparison to the case of being performed each time the determination result is No in S702.

When the determination result in S704 is positive (S704: Yes), the edge server 1 performs the migration recovery processing (S712). Subsequently, the edge server 1 proceeds to the processing of S706.

When the determination result in S704 is negative (S704: No), the edge server 1 performs processing of locking the core space (S705).

After S712 or S705, S706 to S709 respectively corresponding to S604 to S607 of FIG. 10 are performed. Note that, in the case of S706: No, the edge server 1 records the time that the processing of S705 was recently performed in a storage area of the memory or the like (S713).

After S709, the edge server 1 determines whether the target file (file that is opened by the edge server 1 in this write processing (that is, the file to be updated)) is a file that was synchronized from another edge server (S710).

When the determination result in S710 is negative (S710: No), the edge server 1 overwrites the target file with the file according to the write request (S711).

When the determination result in S710 is positive (S710: Yes), the edge server 1 replies an error (Read-Only) (S714). This is because the content of the target file is different from the content that was recognized by the client/host 1 when the write request was sent.

Meanwhile, when a lock could not be applied (S706: No), the edge server 1 records the time that the processing of S705 was started (S713). Subsequently, the edge server performs the processing of S714.

Figure 12:
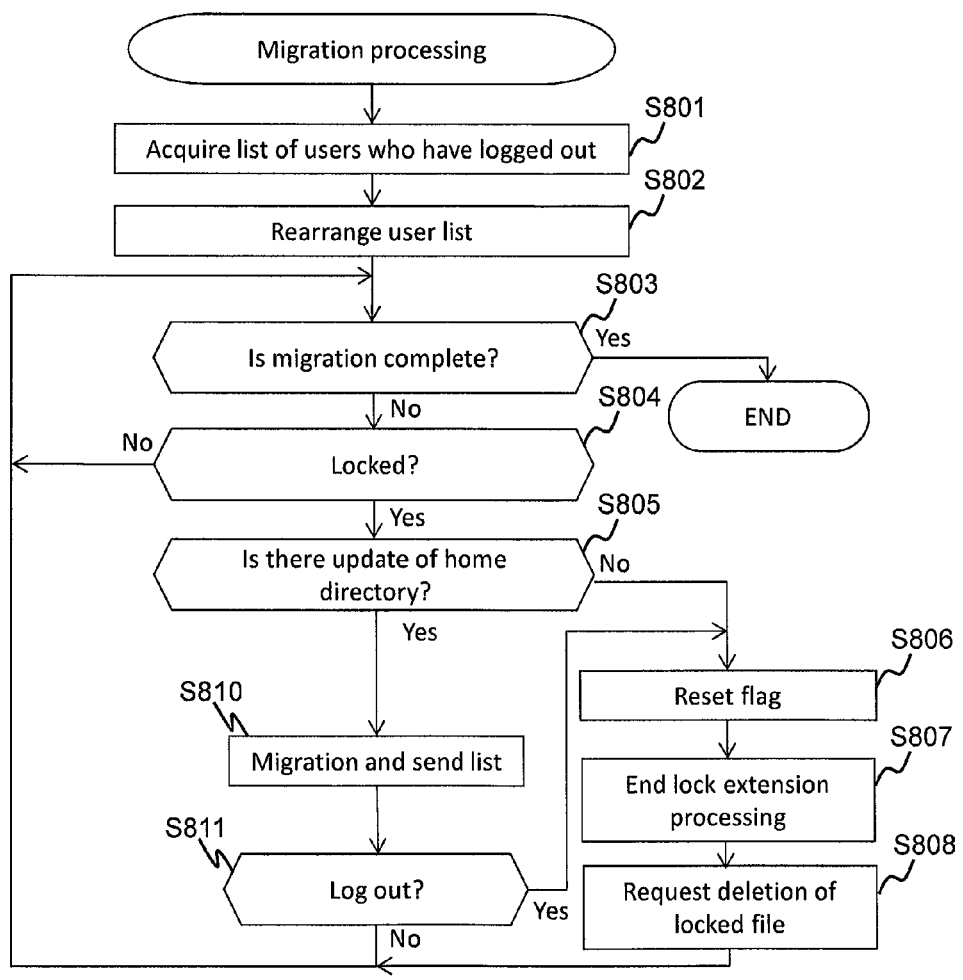
FIG. 12 is the flowchart of migration processing.

FIG. 12 is the flowchart of migration processing.

While the migration processing is processing that is started periodically, it may also be started when a specific event occurs.

The edge server 1 acquires, for each home directory of the edge server 1, a list of users (log out user list) who logged out from the home directory (S801).

The edge server 1 rearranges, for each home directory of the edge server 1, the acquired log out user list according to predetermined rules (S802).

The edge server 1 determines whether all home directories of the edge server 1 have been migrated (S803).

When the determination result in S803 is negative (S803: No), the edge server 1 determines whether it locked the corresponding core space regarding one home directory that is not subject to the processing of S804 onward in this migration processing (S804).

When the determination result in S804 is positive (S804: Yes), the edge server 1 determines whether there is an update of the home directory 1 (S805).

When the determination result in S805 is positive (S805: Yes), the edge server 1 migrates, to the core space, the files identified from the rename list and the update list of the home directory 1, and sends these lists to the core server (S810).

The edge server 1 determines whether the user who was using the home directory 1, which was to be migrated in S810, has logged out (S811).

When the determination result in S811 is negative (S811: No), since the user may update the files in the home directory 1, the edge server 1 performs the processing of S803.

When the determination result in S811 is positive (S811: Yes), or the determination result in S805 is negative (S805: No), the edge server 1 turns OFF the lock flag corresponding to the home directory (S806).

The edge server 1 replies that the lock is not to be extended when there is a lock extension inquiry from the core server 220 (S807). The edge server 1 requests the core server 220 to perform processing for deleting its node number from the lock file (S808). Subsequently, the edge server 1 performs the processing of S803, and determines whether there is any other home directory that has not yet been migrated.

Figure 13:
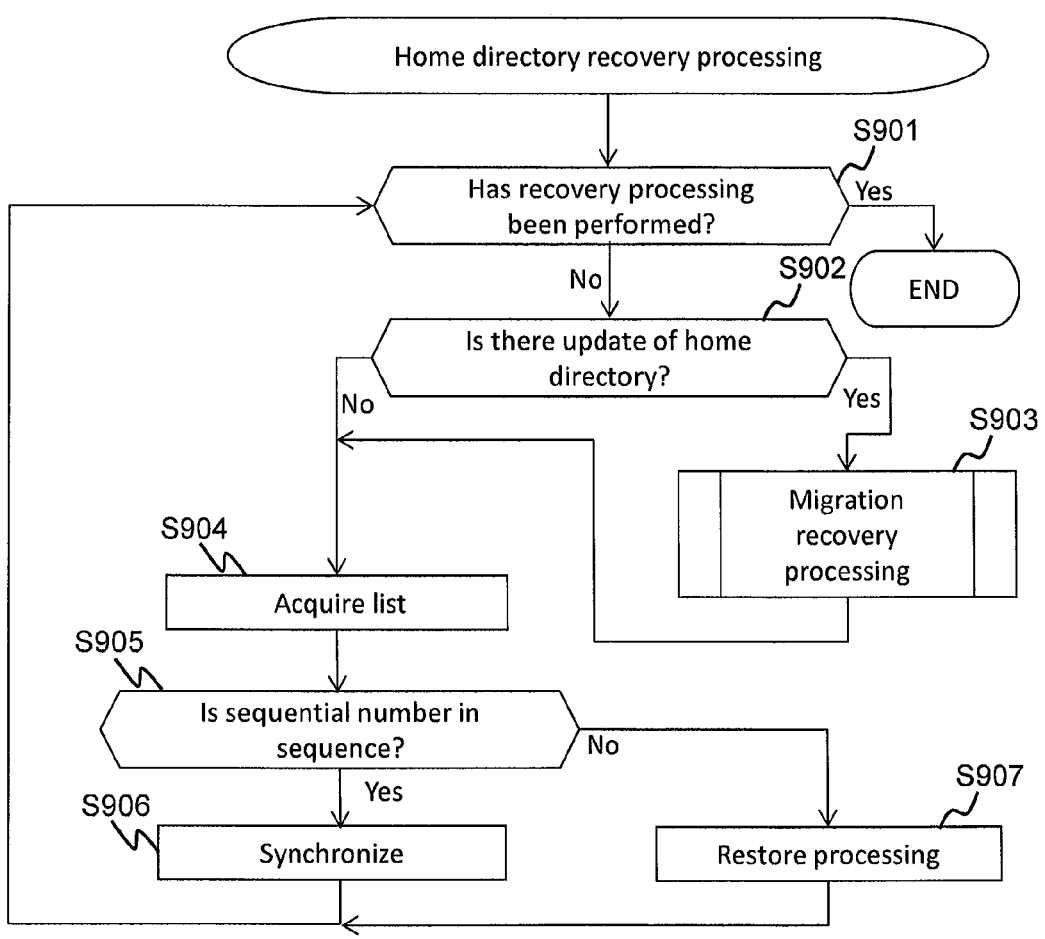
FIG. 13 is the flowchart of home directory recovery processing.

FIG. 13 is the flowchart of home directory recovery processing.

The home directory recovery processing of the edge server 1 is performed when a specific event occurs; for instance, when the edge server 1 is replaced, when the edge server 1 is rebooted, or when there is a fail-over from another edge server to the edge server 1.

The edge server 1 determines whether the recovery processing has been performed to all home directories (S901).

When the determination result in S901 is positive (S901: Yes), the edge server 1 ends the processing.

When the determination processing in S901 is negative (S901: No), the edge server 1 determines whether there is an update of the home directory with regard to one home directory among the home directories to which the recovery processing has not yet been performed (S902).

When the determination result in S902 is positive (S902: Yes), the edge server 1 performs the migration recovery processing (S903).

When the determination result in S902 is negative (S902: No), the edge server 1 acquires the rename list and the update list from the core server 220 (S904).

The edge server 1 checks the sequential numbers associated with the rename list and the update list, and determines whether the sequential numbers are in sequence (S905).

When the determination result in S905 is positive (S905: Yes), the edge server 1 can perform the synchronization by reading the file from the core space into the home directory (S906).

When the determination result in S905 is negative (S905: No), the edge server 1 performs the restore processing of copying all files of the core space to the home directory (S907).

Figure 14:
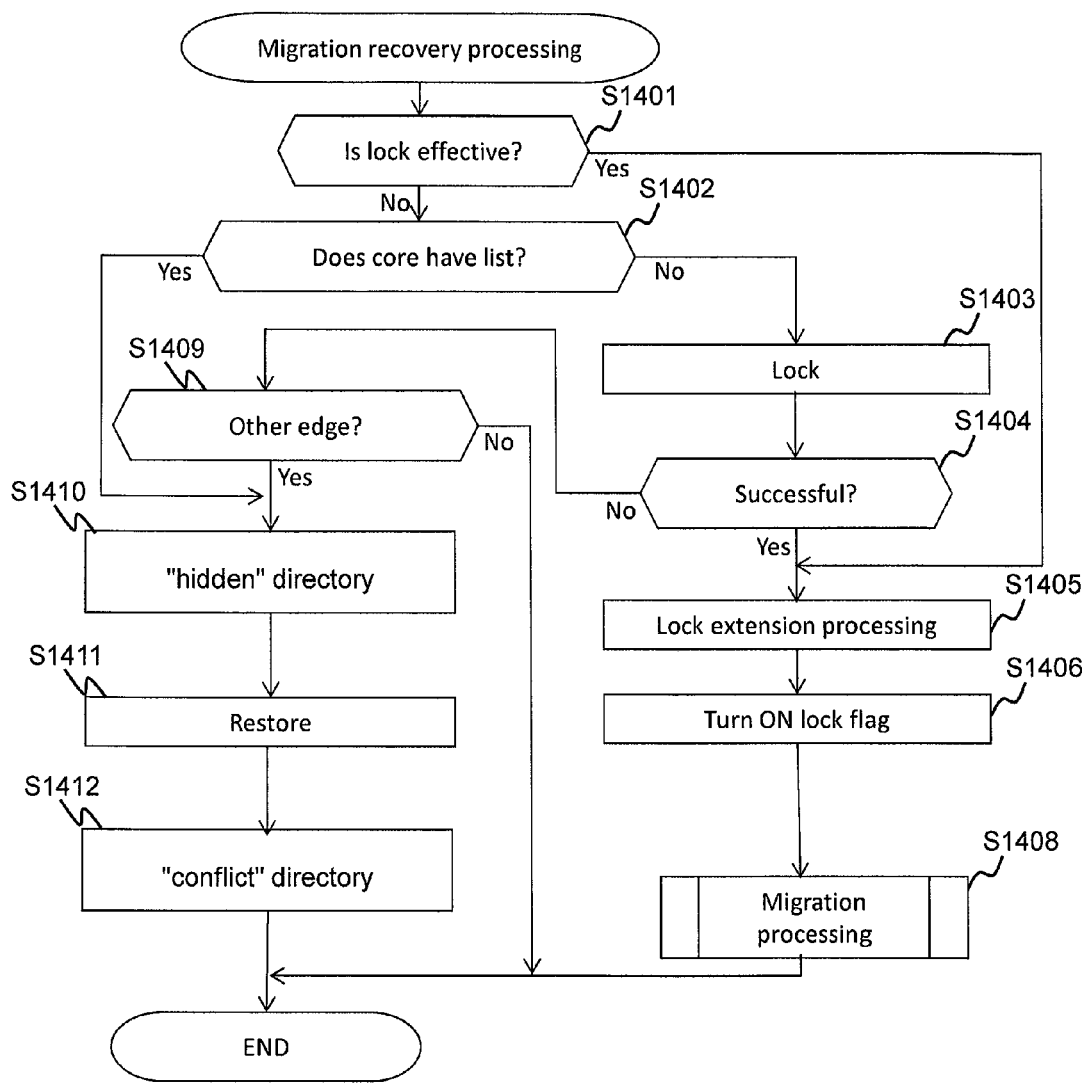
FIG. 14 is the flowchart of migration recovery processing according to Example 1.

FIG. 14 is the flowchart of migration recovery processing according to this Example.

The edge server 1 determines whether the core space corresponding to the home directory 1 is locked according to the same method as S601 of FIG. 10 (S1401).

When the determination result in S1401 is positive (S1401: Yes), the edge server 1 performs the processing of S1405 to S1408. In other words, the lock extension processing is started (S1405). The edge server 1 turns ON the lock flag correspond go the home directory 1 (S1406). The edge server 1 performs the migration processing of FIG. 12 (S1408). Note that the migration processing does not have to be performed. This is because the migration processing is processing that is performed periodically.

When the determination result in S1401 is negative (S1401: No), the edge server 1 determines whether there is an update list and a rename list from another edge server (S1402). For example, the edge server 1 makes an inquiry to the core server regarding whether there is an update list and a rename list from another edge server regarding the core space. If there is an update list or a rename list from another edge server with regard to the core space, the core server sends that list to the edge server 1. If both lists exist, then both lists are sent.

When the determination result in S1402 is negative (S1402: No), the edge server 1 locks the core space (S1403). When a lock could be applied, S1405 to S1408 are performed.

When a lock could not be applied (S1404: No), the edge server 1 determines whether the core space has been locked by another edge server (S1409). This determination is the determination of whether a node number of another edge server is indicated in the lock file acquired with regard to the core space.

When the determination result in S1409 is positive (S1409: Yes), the edge server 1 moves, to the "hidden" directory, all files and directories below the route directory of the current home directory (S1410) (refer to step 2 of FIG. 7). Subsequently, the edge server 1 copies, below the route directory of the home directory 1, the subordinate directory (and the subordinate file) of at least the route directory among the files and directories below the route directory of the core space (S1411) (refer to step 3 of FIG. 7). In other words, the edge server 1 restores the directories (and files) below the route directory of the core space to the home directory 1. Subsequently, the edge server 1 creates a "conflict" directory as the subordinate directory of the route directory of the home directory 1, and copies, to the "conflict" directory, the files and directories that are identified from the rename list 1301A and the update list 1302A among the files and directories below the "hidden" directory (S1412) (refer to step 4 of FIG. 8).

When the determination result in S1409 is negative (S1409: No), the edge server 1 ends the processing.

When the determination result in S1402 is positive (S1402: Yes), the edge server 1 performs S1410 to S1412.

According to Example 1, files that are different from the files and directories in the core space among the files and directories in the home directory 1 are copied to the "conflict" directory, and that "conflict" directory is migrated to the core space. Consequently, it is possible to avoid the occurrence of a reversion in the core space.

Example 2

Example 2 is now explained. Here, the differences with Example 1 are mainly explained, and the explanation of the features that are common with Example 1 are either omitted or simplified. Specifically, since the main difference between Example 1 and Example 2 is in the migration recovery processing, the migration recovery processing according to Example 2 is selectively described in the ensuing explanation.

Prior to this explanation, an example of a state before a failure occurs in the first communication network and the recovery of that failure in Example 2 is foremost explained with reference to FIG. 15.

Figure 15:
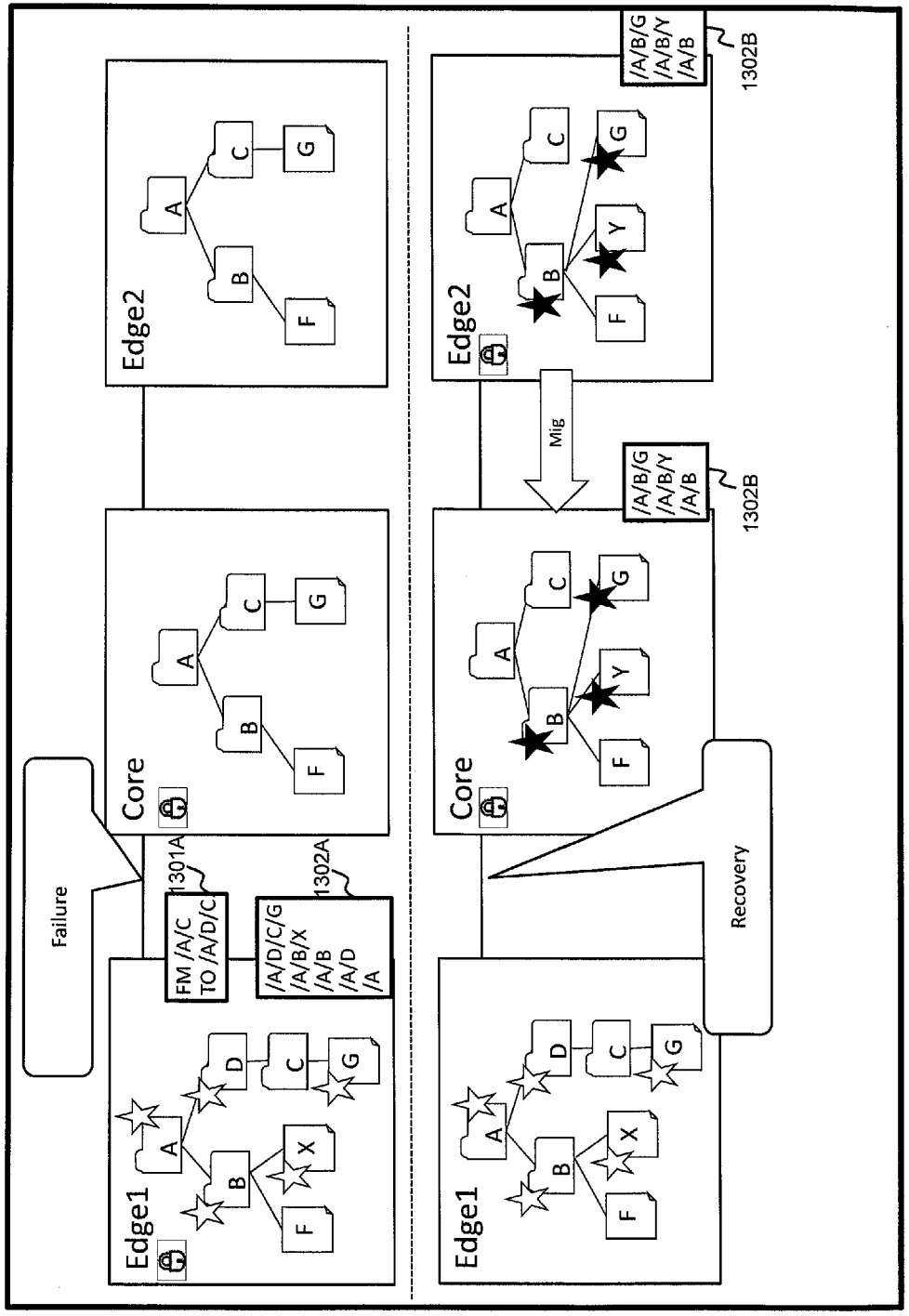
FIG. 15 is a schematic diagram showing an example of the flow from the occurrence of a network failure to the recovery of the network failure in Example 2.
Figure 17:
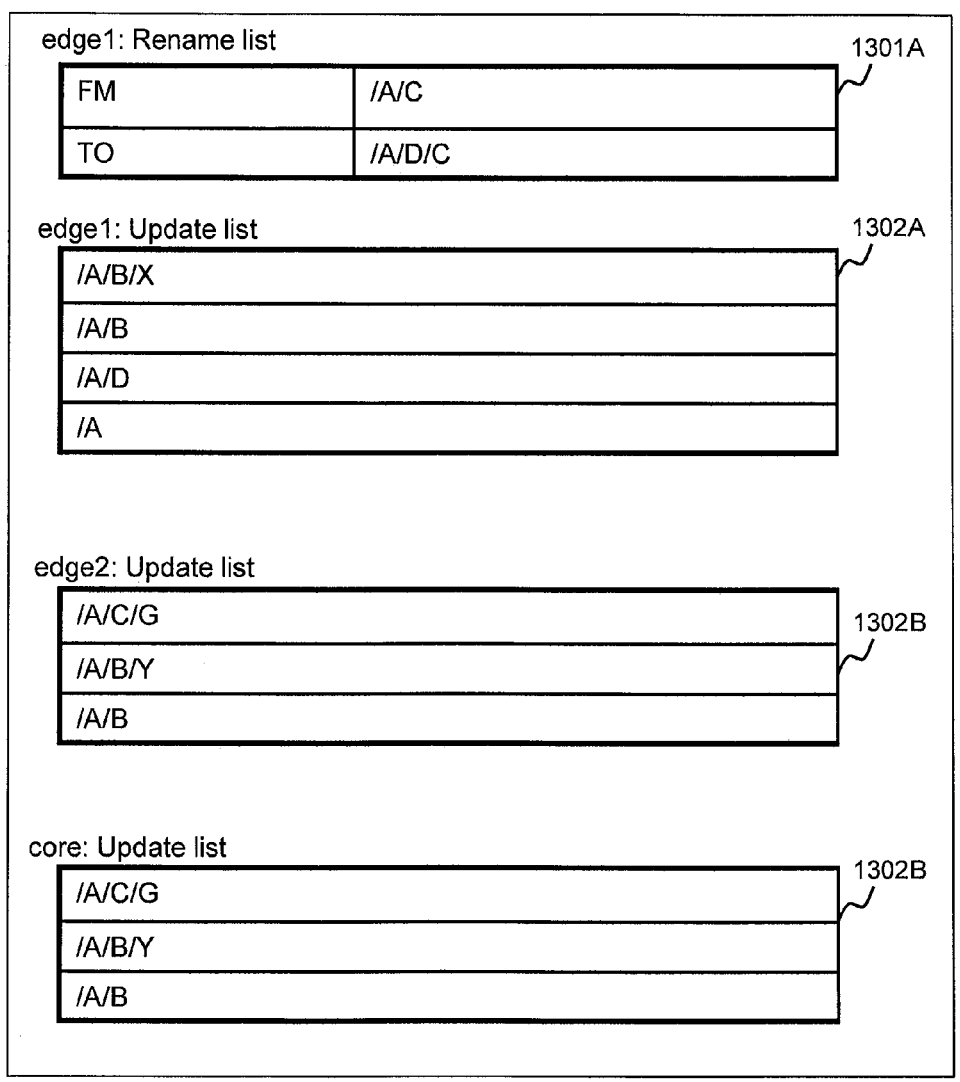
FIG. 17 shows the rename list and the update list in Example 2.

As shown in the upper row of FIG. 15, before a failure occurs in the first communication network, let it be assumed that the path "/A/C" is updated to the path "/A/D/C" as shown in the rename list of the home directory 1 (refer to FIG. 17), and the files "X" and "G" are updated as shown in the update list of the home directory 1.

As shown in the lower row of FIG. 15, in the home directory 2, let it be assumed that the subordinate file "Y" is added to the directory "B", and the file "G" is moved from the directory "C" to the directory "B". Consequently, the edge server 2 records "/A/B/G", "/A/B/Y" and "/A/B" are recorded in the update list 1302B of the home directory 2 (refer to lower row of FIG. 15 and FIG. 17).

The edge server 2 migrates the updated file "Y" and the moved file "G" in the home directory 2 to the core space. Moreover, the edge server 2 sends the update list 1302B (and the rename list) of the home directory 2 is sent to the core server. Consequently, as shown in the lower row of FIG. 15 and FIG. 17, the core server will receive and possess the update list 1302B (and the rename list) of the home directory 2.

Figure 16:
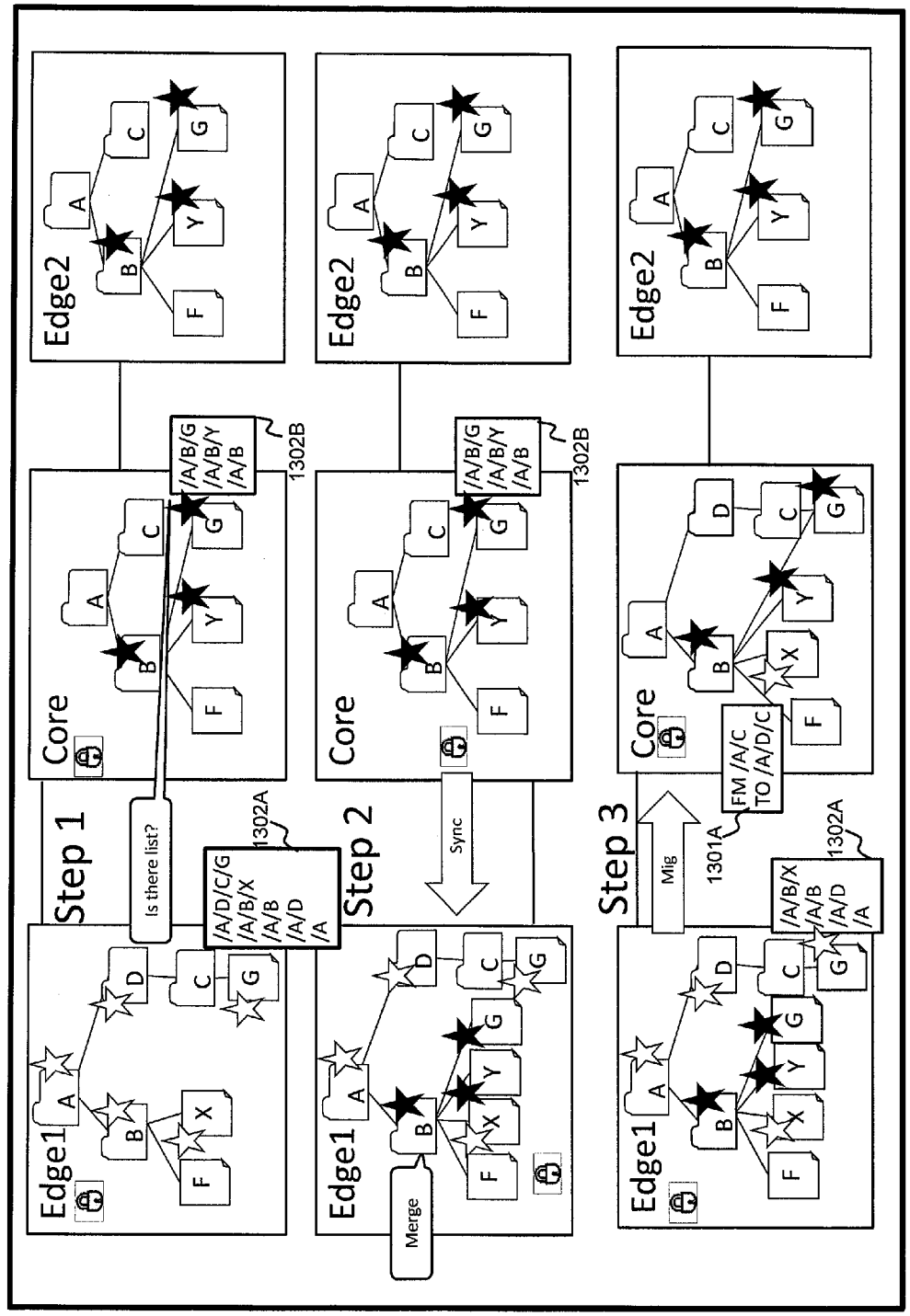
FIG. 16 is a schematic diagram showing a part of the general example of processing that is performed when the network failure is recovered in Example 2.

Subsequently, after the failure of the first communication network is recovered, the processing shown in FIG. 16 is performed.

Step 1

In step 1, processing that is similar to the processing performed in step 1 of FIG. 7 is performed.

Step 2

When the determination result in step 1 is positive (when it is determined that there is the rename list or the update list 1302B in step 1), the edge server 1 synchronizes the home directory 1 with the core space. In other words, the edge server 1 reads the update files "Y" and "G" (files identified from the update list 1302B of the core space) in the core space into the home directory 1. Consequently, the latest files "Y" and "G" are merged with the subordinate of the directory "B". Note that, with regard to the file "G", the edge server 1 can recognize that there is the file "G" as the subordinate file of the directory "C" in the home directory 1 and the file "G" has been merged as the subordinate file of the directory "B" based on the UUID identified from the path name, even though the path name is different. In addition, at this stage, the edge server 1 deletes the path name of the file "G" from the update list 1302A of the home directory 1. This is in order to prevent the old file "G" in the home directory 1 from being migrated to the core space in subsequent step 3. Moreover, if the path names of the update file "G" in the home directory 1 and the core space are the same and the file "G" is read from the core space, the edge server 1 compares the update time point of the update file "G" of the home directory 1 (time stamp in the metadata) and the update time point of the update file "G" of the core space (time stamp in the metadata), and overwrites the old file "G" with the file "G". In other words, in the example of FIG. 16, while the file "G" coexists in the home directory 1 since the path names are different, when the path names are the same, the new file "G" will exist in substitute for the old file "G".

Step 3

The edge server 1 migrates, to the core space, the update file "X" that is not stored in the core space (file that is identified from the update list 1302A). Note that, while the subordinate file "G" of the directory "D" is also an update file, as described above, since the path name of that file "G" is deleted from the update list 1302A (since the file "G" from the core space is newer), the edge server 1 does not migrate the subordinate file "G" of the directory "D" to the core space. Moreover, as described above, the edge server 1 sends the rename list 1301A and the update list 1302A to the core server in the case of migration. The core server updates the path "/A/C" to the path "/A/D/C" and adds the newest file "G" as the subordinate file of the directory "C" based on the rename list 1301A (and the update list 1302A). In other words, a part of the directory structure of the home directory 1 is reflected in the core space. Consequently, it is possible to access the latest file "G" via the path including the directory "B" and the path including the directory "C". The migration processing (reflection of the update of the home directory in the core space) and the synchronization processing (reflection of the update of the core space in the home directory) are performed periodically. Accordingly, the update of the core space in step 3 is eventually reflected in the home directory 2. Consequently, the directory structure of the home directory 2 becomes the same as the directory structure of the core space in step 3.

Figure 18:
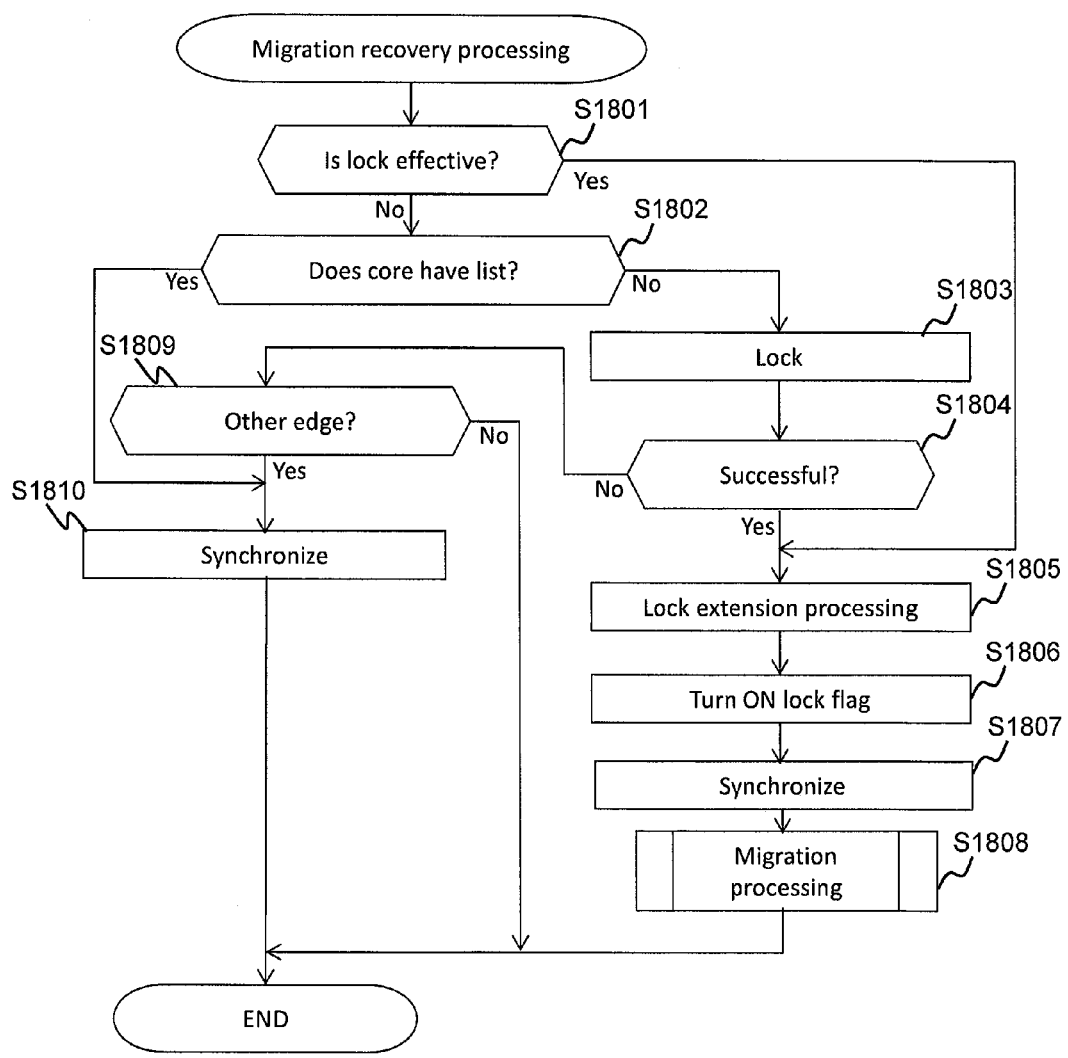
FIG. 18 is the flowchart of migration recovery processing according to Example 2.

FIG. 18 is a flowchart of the migration recovery processing according to Example 2.

According to FIG. 18, S1801 to S1806 are respectively the same as S1401 to S1406 of FIG. 14.

After S1806, the edge server 1 performs the synchronization processing of reflecting the update of the core space in the home directory 1. In other words, the edge server 1 reads the update of the core space (files and directories that are identified from the rename list and the update list of the core space) into the home directory 1. Subsequently, the edge server 1 performs the migration processing of FIG. 12.

When the determination result in S1809 is positive (S1809: Yes), the edge server 1 performs the same synchronization processing as S1807 (S1810).

According to Example 2, even if the home directory 1 includes an old update file corresponding to the update file in the core space, the update file is not migrated to the core space. Consequently, it is possible to prevent the occurrence of a reversion in the core space.

Example 3

Example 3 is now explained. Here, the differences with Example 1 are mainly explained, and the explanation of the features that are common with Example 1 are either omitted or simplified. Specifically, since the main difference between Example 1 and Example 3 is in the migration recovery processing, the migration recovery processing according to Example 3 is selectively described in the ensuing explanation.

Prior to this explanation, an example of a state before a failure occurs in the first communication network and the recovery of that failure in Example 2 is foremost explained with reference to FIG. 19.

Figure 19:
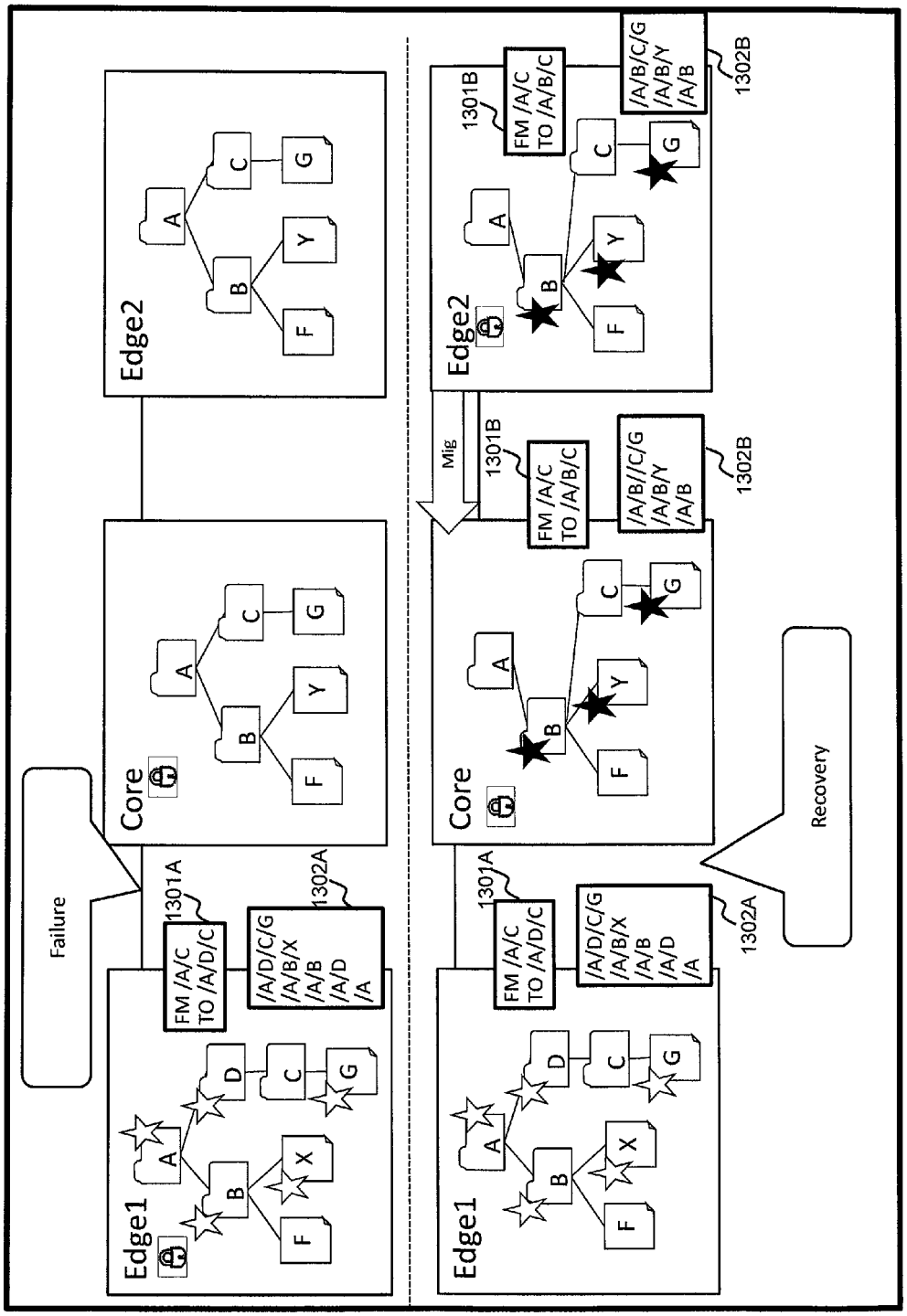
FIG. 19 is a schematic diagram showing an example of the flow from the occurrence of a network failure to the recovery of the network failure in Example 3.
Figure 22:
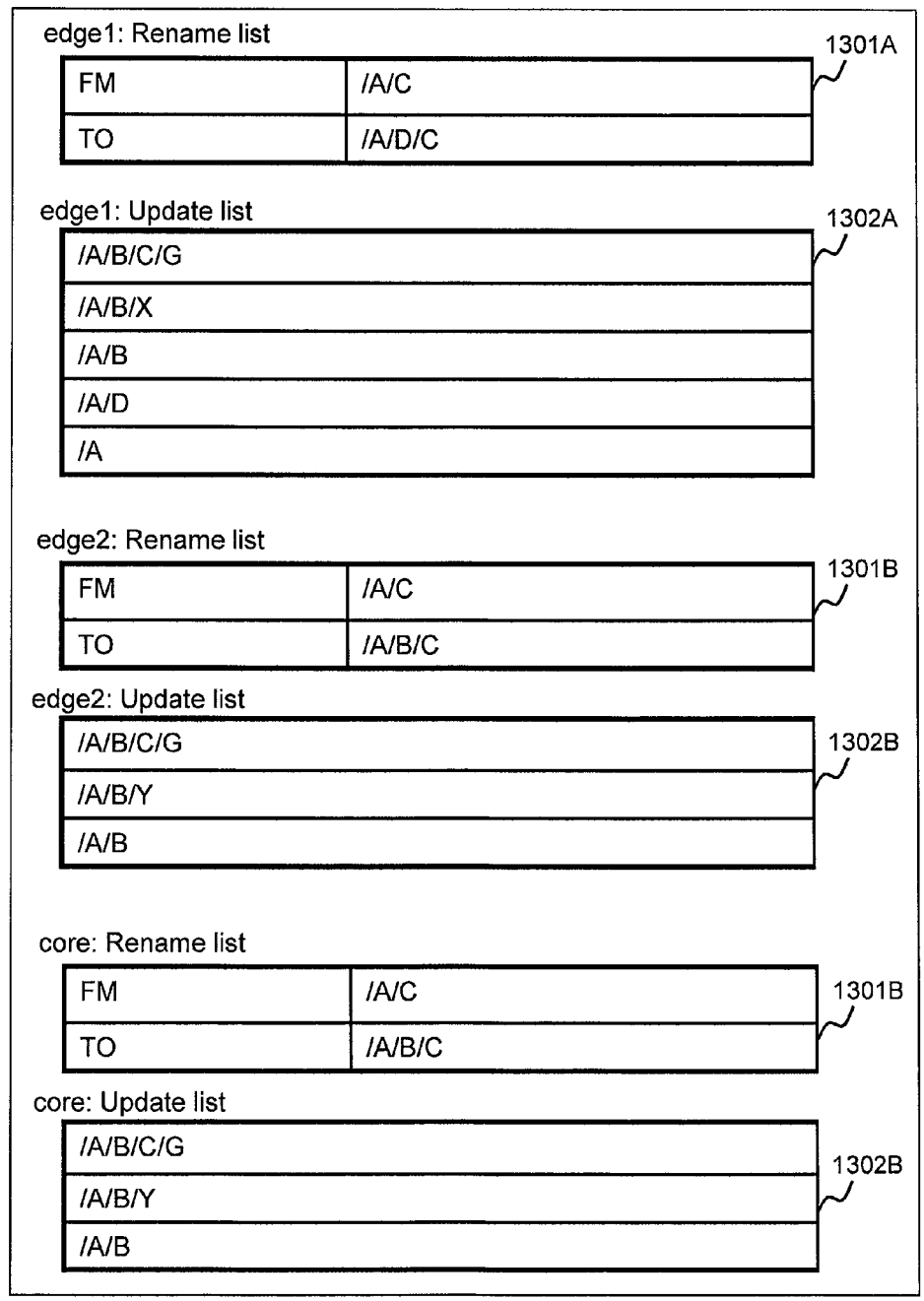
FIG. 22 shows the rename list and the update list in Example 3.

As shown in the upper row of FIG. 19, before a failure occurs in the first communication network, let it be assumed that the path "/A/C" is updated to the path "/A/D/C" as shown in the rename list 1301A of the home directory 1 (refer to FIG. 22), and the files "X" and "G" are updated as shown in the update list 1302A of the home directory 1. When a failure occurs in the first communication network, the user logs into the home directory 2 in substitute for the home directory 1, but the tree structure of the home directory 2 is the same as the tree structure of the core space at the time point that the failure occurred in the first communication network.

As shown in the lower row of the FIG. 19, in the home directory 2, let it be assumed that the path "/A/C" is updated to the path "/A/B/C", the subordinate file "Y" of the directory "B" is updated, and the subordinate file "G" of the directory "C" is updated. Consequently, the edge server 2 records FM "/A/C" and TO "/A/B/C" in the rename list 1301B of the home directory 2, and records "/A/B/C/G", "/A/B/Y" and "/A/B" in the update list 1302B of the home directory 2 (refer to lower row of FIG. 19 and FIG. 22).

The edge server 2 migrates, to the core space, the updated files "Y" and "G" in the home directory 2. Moreover, the edge server 2 sends, to the core server, the update list 1302B and the rename list 1301B of the home directory 2. Consequently, as shown in the lower row of FIG. 19 and FIG. 22, the core server receives and possesses the update list 1302B and the rename list 1301B of the home directory 2.

Figure 20:
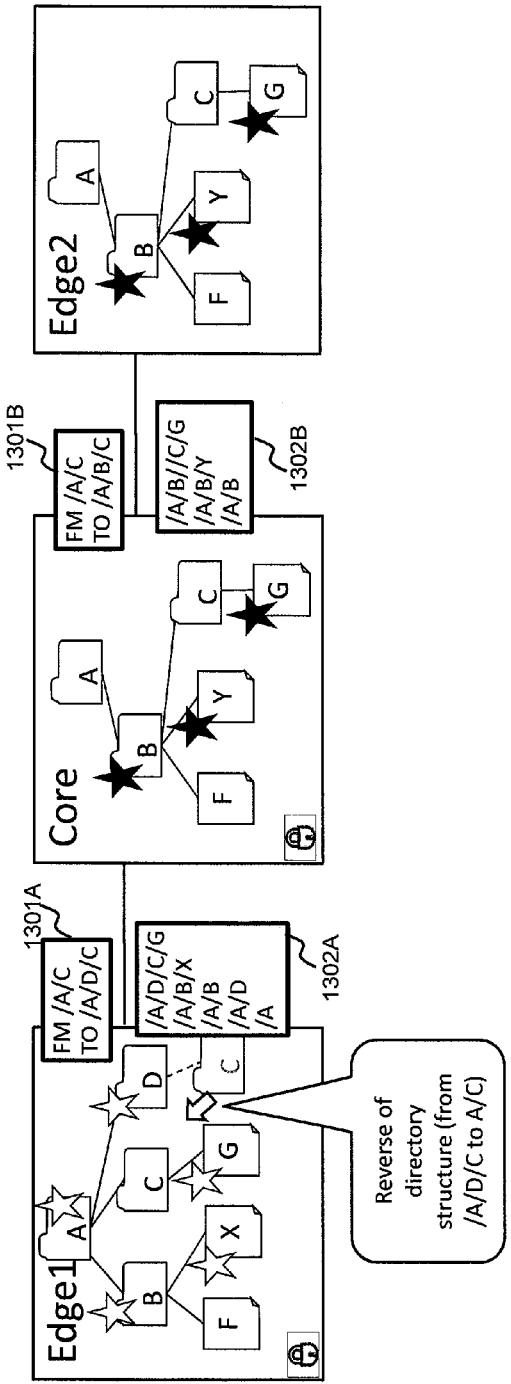
FIG. 20 is a schematic diagram showing a part of the general example of processing that is performed when the network failure is recovered in Example 3.
Figure 21:
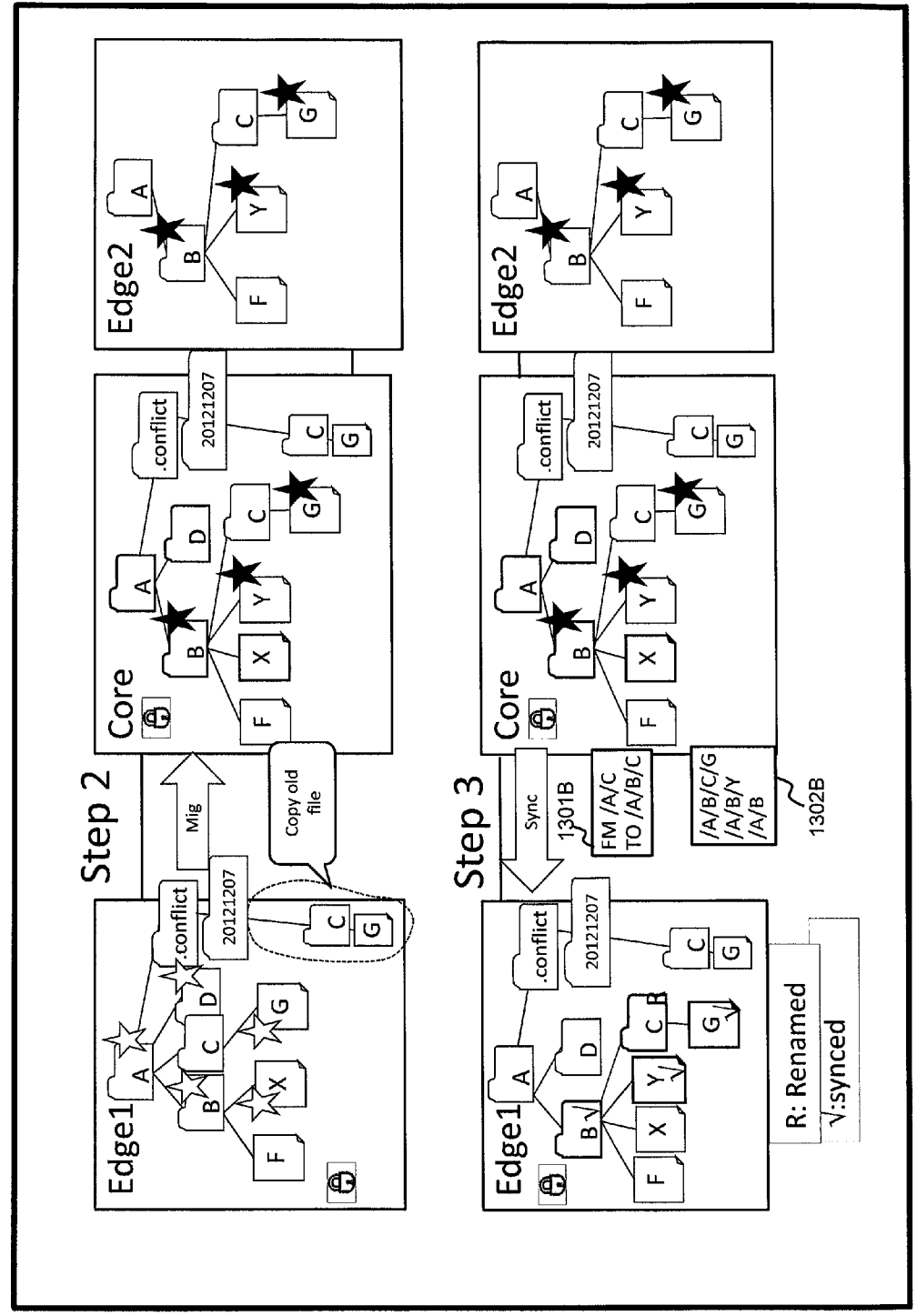
FIG. 21 is a schematic diagram showing a part of the general example of processing that is performed when the network failure is recovered in Example 3.

Subsequently, when the failure of the first communication network is recovered, the processing shown in FIG. 20 and FIG. 21 is performed.

Step 1

In step 1, the edge server 1 reverses the directory structure; that is, returns the structure "/A/D/C" of the path after the update to the structure "/A/C" of the path before the update based on the rename list 1301A. Consequently, the subordinate directory "C" is deleted from the directory "D", and the directory "C" becomes the subordinate directory of the route directory.

Step 2

The edge server 1 identifies the respective update files in the home directory 1 from the path name of the respective update files in the home directory 1 in which the directory structure was reversed, and compares the update time point of the respective update files in the home directory 1 and the update time point of the respective update files in the core space. The edge server 1 adds the subordinate directory "conflict" of the route directory of the home directory 1 if there is an old update file in the home directory 1, and adds a directory (hereinafter referred to as the "time stamp directory") which has, as the directory name, the time point that the "conflict" directory was created (for example, time point indicated as year, month and day) as the subordinate directory of the "conflict" directory. In addition, the edge server 1 copies the old update file "G" in the home directory 1 to the time stamp directory while maintaining the path structure. Moreover, the edge server 1 deletes the path name of the old update file, which was copied to the time stamp directory, from the update list 1302A. Subsequently, the edge server 1 migrates the update file of the home directory 1 (file that is identified from the update list 1302A) and the "conflict" directory to the core space, and sends the update list 1302A and the rename list 1301A to the core server. Consequently, as a result of the "conflict" directory existing in the core space, and, in the core space, the subordinate file "X" is added to the directory "B" and the subordinate directory "D" is added to the route directory based on the update list 1302A and the rename list 1301A. Note that, even when the core server receives the update list 1302A and the rename list 1301A, the core server still possesses the update list 1302B and the rename list 1301B. Specifically, for example, the core server may possess the received rename list and update list for each edge server with regard to one core space. When the core server newly receives the rename list and update list from the same edge server, the core server can delete the previously received rename list and update list from that edge server, and store the newly received rename list and update in the memory.

Step 3

The edge server 1 reads (synchronizes) the files (directories) that are not stored in the home directory 1 from the core space into (with) the home directory based on the lists 1301B and 1302B from another edge server 2. Here, the files "Y" and "G" and the updated directory "B" are read into the home directory 1. In FIG. 21, a check mark is assigned to the icon of the synchronized (overwritten) directories and files in the home directory 1, and a mark "R" which indicates that the path structure has been returned to the latest structure is assigned to the icon of the directory via the path in which the structure has been returned.

Figure 23:
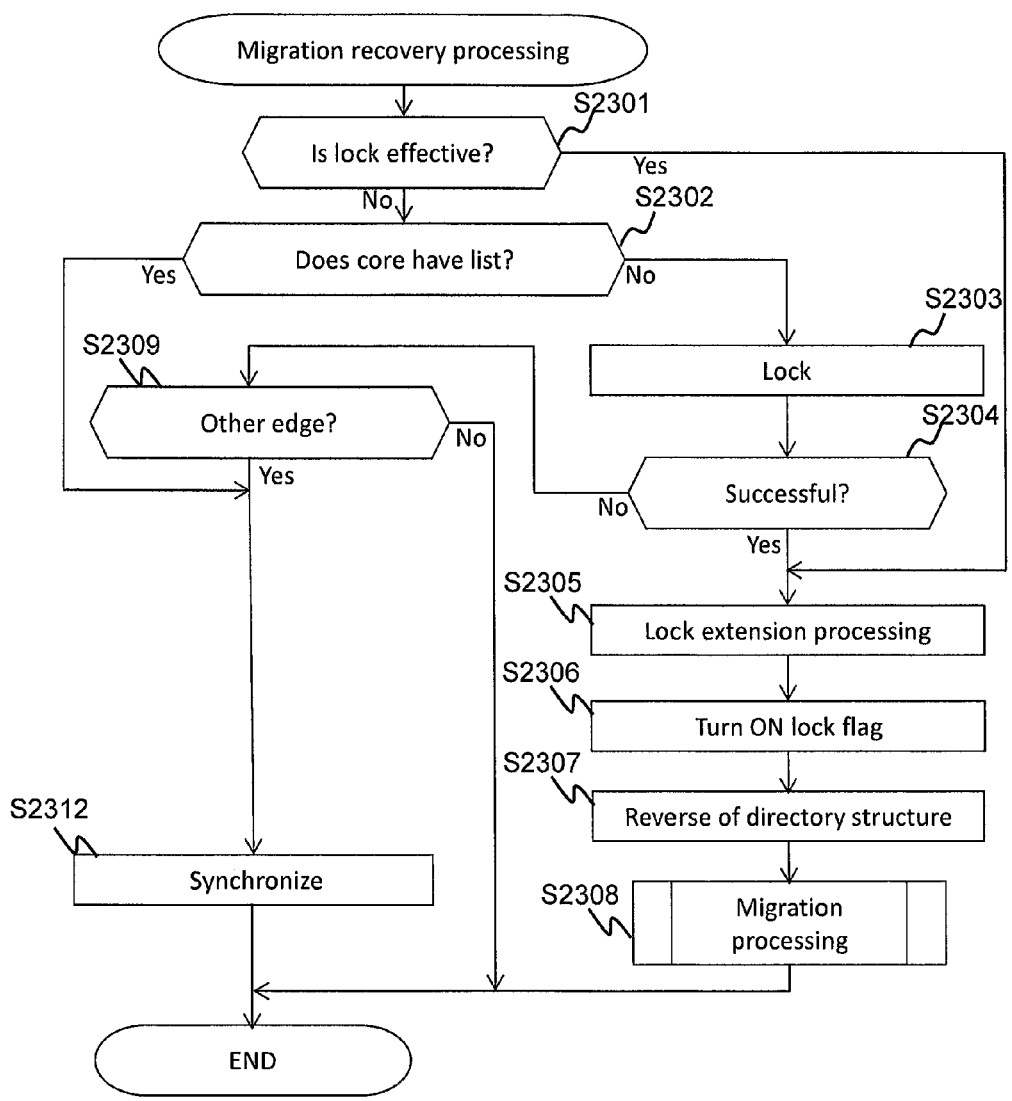
FIG. 23 is the flowchart of migration recovery processing according to Example 3.

FIG. 23 is a flowchart of the migration recovery processing according to Example 3.

According to FIG. 23, S2310 to S2306 are performed in substitute for S1410 to S1406 of FIG. 14.

After S2306, the edge server 1 restores the directory structure of the home directory 1 based on the rename list 1301A (S2307) (refer to step 1 of FIG. 20). In addition, the edge server 1 performs the migration processing of FIG. 12 (refer to step 2 of FIG. 21).

When the determination result of S2309 is positive (S2309: Yes), the edge server 1 performs the synchronization processing of synchronizing the home directory 1 with the core space (S2312).

According to Example 3, whether the update file in the home directory 1 or the update file in the core space is older is determined and, if the home directory 1 contains the old update file, that old update file is copied to the "conflict" directory, and that "conflict" directory is migrated to the core space. It is thereby possible to prevent the occurrence of reversion in the core space.

Moreover, according to Example 3, as shown in step 1 of FIG. 20, since the directory structure of the home directory 1 is reversed, the computational effort can be reduced in comparison to Example 2 in which the directory structure of the home directory 1 is not reversed.

While several Examples were described above, the present invention is not limited to the Examples, and it goes without saying that the present invention can be modified to the extent that the modification does not deviate from the gist of the invention.

For example, in Example 3, the directory structure of the core space may be reversed based on the rename space 1301B in step 1 of FIG. 20, and, after step 2 of FIG. 21 is performed, the directory structure of the core space may be restored to the state before being reversed.

Moreover, in Example 3, each time a file is copied to the subordinate of the "conflict" directory, a directory having, as its directory name, a value indicating the update time point (time stamp) of that file may be added.

Moreover, for example, in Example 1, a directory having, as its directory name, a value indicating the time point (time stamp) that the "conflict" directory was created may be added as the subordinate directory of the "conflict" directory, and files below "hidden" directory may be copied to the subordinate of the added directory.

REFERENCE SIGNS LIST 120 edge server
220 core server

The invention claimed is:

1. An edge server configured to perform overwrite preventive processing of a corresponding file in a core server, comprising:
a communication interface device which is configured to communicate with a core server; and
a processor which is connected to a memory and the communication interface device and configured to provide a first home directory and write a file in the first home directory according to a write request to the first home directory, wherein
the core server provides a core space,
the core space is a file system space to become a copy destination of updates of files and directories of each of the first home directory and a second home directory,
the first home directory is a first file system space used by a user,
the second home directory is a second file system space used by the user and provided by a separate edge server,
wherein a first file is a file in the first home directory that has been updated,
the preventive processing is executed by the processor and includes the processes of:
creating a first directory in the first home directory;
copying the first file to the first directory while maintaining a path structure of the first file;

copying the first directory to the core space as the process of copying the update of the first home directory to the core server;

creating a second directory in the first home directory; and moving directories, excluding the second directory, and files belonging to a route directory of the first home directory to the second directory while maintaining the path structure, wherein the first file copied to the first directory is a same file as a file in the files that have been moved to the second directory, and the path structure of the first file in the second directory is a same as the path structure in the first directory, wherein the second file is a file that has been updated in the second home directory and copied to the core space, and wherein the first file is a file that corresponds to the second file and has not been copied to the core space.

2. The edge server according to claim 1, wherein the files copied to the first directory are all files that have been updated in the first home directory.

3. The edge server according to claim 2, wherein the preventive processing further includes a process of copying, to the first home directory, at least a subordinate directory or a subordinate file of a route directory of the core space.

4. The edge server according to claim 2, wherein the preventive processing includes a process of maintaining the inclusion of the update of the path structure of the first file in the update of the first home directory so that the updated path structure of the updated first file is added to the core space as the path structure to the second file based on the reflection of the update of the first home directory in the core space.

5. The edge server according to claim 2, wherein the preventive processing further includes the following process of overwriting the first file with the second file when the respective path structures of the first file and the second file are the same and the update time point of the first file is older than the update time point of the second file in the synchronization processing.

6. The edge server according to claim 1, wherein the preventive processing includes the process of:

determining whether one of an update time point of the first file and an update time point of the second file is older than the other; and copying the first file to the first directory when the update time point of the first file is older than the update time point of the second file.

7. The edge server according to claim 6, wherein the preventive processing further includes the following processes of:

reversing a directory structure of the first home directory to a directory structure prior to the update; and identifying, after the reverse, the first file among the files that have been updated in the first home directory.

8. The edge server according to claim 6, wherein the preventive processing includes a process of creating, in a subordinate of the first home directory, a time stamp directory which is a directory that includes, as a directory name, a value indicating a creation time point of the first home directory or an update time point of the first file, and the processor is configured to copy the first file to the subordinate of the time stamp directory in the preventive processing.

9. The edge server according to claim 6, wherein the processor is configured to copy the update of the core space to the first home directory after the update of the first home directory is copied to the core server.

10. The edge server according to claim 1, wherein the preventive processing includes the following processes of:

synchronization processing of copying the update of the core space to the first home directory; and copying the second file to the first home directory while maintaining a path structure of the second file in the core space and excluding the first file from the update of the first home directory when the respective path structures in the first file and the second file are different in the synchronization processing.

* * * * *